(12) United States Patent
Fantone et al.

(10) Patent No.: US 6,226,081 B1
(45) Date of Patent: May 1, 2001

(54) OPTICAL HEIGHT OF FILL DETECTION SYSTEM AND ASSOCIATED METHODS

(75) Inventors: Stephen D. Fantone, Lynnfield; Brian W. Anthony, Somerville; Kevin M. Sevigny, Newburyport; Stephen R. Wilk, Saugus, all of MA (US)

(73) Assignee: Optikos Corporation, Cambridge, MA (US)

( * ) Notice: Subject to any disclaimer, the term of this patent is extended or adjusted under 35 U.S.C. 154(b) by 0 days.

(21) Appl. No.: 09/039,632

(22) Filed: Mar. 16, 1998

Related U.S. Application Data

(60) Provisional application No. 60/042,377, filed on Mar. 24, 1997.

(51) Int. Cl.[7] .............................. G01N 21/00; G01N 21/90
(52) U.S. Cl. ................. 356/239.6; 356/427; 250/223 B; 382/142
(58) Field of Search .............................. 356/240.1, 239.4, 356/239.6, 426–428; 250/223 B, 900, 901, 498.1; 382/142; 348/127

(56) References Cited

U.S. PATENT DOCUMENTS

| | | | | |
|---|---|---|---|---|
| 3,094,213 | * | 6/1963 | Wyman | 250/223 B |
| 3,218,463 | * | 11/1965 | Calhoun | 250/223 B |
| 3,232,429 | * | 2/1966 | Norwich | 250/223 B |
| 3,784,872 | * | 1/1974 | Calhoun | 250/498.1 |
| 3,818,232 | * | 6/1974 | Kirkpatrick | 356/239.6 |
| 4,028,553 | | 6/1977 | Farcinade . | |
| 4,182,451 | * | 1/1980 | Watson | 250/223 B |
| 4,654,535 | | 3/1987 | Wolske . | |
| 4,733,095 | | 3/1988 | Kurahashi et al. . | |
| 4,956,560 | * | 9/1990 | Smith, Jr. et al. | 250/223 B |
| 5,305,391 | | 4/1994 | Gomibuchi . | |
| 5,414,778 | * | 5/1995 | Schwartz et al. | 356/427 |
| 5,523,560 | | 6/1996 | Manique et al. | 250/223 B |
| 5,536,935 | * | 7/1996 | Klotzsch et al. | 250/223 B |
| 5,542,004 | | 7/1996 | Constant et al. . | |

FOREIGN PATENT DOCUMENTS 0 061 797   10/1982   (EP) .

OTHER PUBLICATIONS

Automated visual inspection, 1985, "Case No. 20", p. 499.
First Written Opinion issued on Jul. 1, 1999 in connection with International Application No. PCT/US98/05627.

* cited by examiner

Primary Examiner—Hoa Q. Pham
(74) Attorney, Agent, or Firm—Francis J. Caufield

(57) ABSTRACT

The height-of-fill of a container comprising a body having an optically detectable feature, and contents filling the body up to a fill level, at least a measuring portion of the container extending from the optically detectable feature to the fill level being capable of transmitting electromagnetic radiation, is determined by illuminating at least the measuring portion of the container with electromagnetic radiation; forming an image of part of this measuring portion of the container; and analyzing the image by data processing means to identify: (a) a first region having a first intensity that varies in accordance with the properties of the optically detectable feature; and (b) a second region having a second intensity that varies in accordance with the optical properties of the contents below the fill level, and determining the distance between a point within the first region and the upper edge of the second region, thereby determining the height-of-fill.

35 Claims, 26 Drawing Sheets

OPTICAL HEIGHT OF FILL DETECTION SYSTEM AND ASSOCIATED METHODS

REFERENCE TO RELATED APPLICATION

This application claims priority from Provisional Application Ser. No. 60/042,377, filed Mar. 24, 1997.

BACKGROUND OF THE INVENTION

This invention generally relates to the field of measurement of the fill level of the contents of containers at least part of which is transparent, and more particular to optical means by which the height of fill can be measured in such containers, for example glass or plastic bottles, whether of clear or colored glass or other material. The term "transparent" is used herein to mean capable of transmitting electromagnetic radiation at an adopted working wavelength band, not necessarily within just the visible region. For example, certain embodiments of the invention use infra-red radiation, and can thus be used with glasses which are transparent in the infra-red though not in the visible.

Although the invention may be used for other purposes, for example measuring the height-of-fill (HOF) of pulverulent (e.g., powder) materials in glass ampoules, it is primarily intended to address the problem of measuring the HOF of the fluid contents of transparent beverage containers, such as soda or beer bottles, to determine if they meet specifications for their volumetric content, which directly correlates to HOF for a known bottle geometry. While a bottle could possibly be stationary it is typically moving at appreciable speed while conveyed along a production line, so it is measured while moving, but at sampling rates that are sufficiently fast so that the bottle appears "stopped" to the measuring optical system. Preferred embodiments of the invention have been tailored to meet the needs of bottled beers in clear, green and brown glass containers. As will be seen, the system preferably utilizes a line scan CCD imager to provide high-speed image capture.

Height of Fill is traditionally measured using an x-ray beam that is set to 3 mm below the calibrated liquid level. When the beam signal changes, the fill is within limits, and produces a yes/no only answer to a Host control system, usually in the form of a computer of other suitable microprocessor based system.

Optical systems for measuring HOF are also known. For example, U.S. Pat. No. 3,232,429 (Norwich) describes a fill level detector for use in checking the HOF of bottles of foamable liquid passing along a filling line. The presence of a bottle at a measuring station is detected by a mechanical switch, and two beams from light sources are passed through the upper end of the bottle on to two photodetectors. Depending upon the output from the photodetectors, the bottle is classified as acceptably filled, underfilled, or empty, and the latter two categories of bottle are removed from the filling line by a mechanical rejection device. Since this apparatus uses only two spaced photodetectors, only one of which detects the presence of liquid contents lying beneath the foam in the bottle, it gives only a yes/no answer as to whether the bottle is sufficiently filled and cannot measure the actual HOF. Furthermore, since the HOF detection is made from fixed apparatus lying alongside the filling line, the process cannot compensate for vertical variations in the position of the bottle such as tend to occur when bottles are being transported by a flexible conveyor.

U.S. Pat. No. 5,414,778 (Schwartz et al.) describes an apparatus for measuring HOF of a carbonated or similar fluid which is in a "dynamic state" immediately after filling of a bottle. The somewhat elaborate process described in this patent requires line-by-line analysis of a two dimensional image of a part of the bottle, above and below the fill line produced by a video camera; this analysis serves to identity not only the HOF but also the number and size of bubbles within the liquid. To carry out such an image analysis on bottles on a commercial filling line, which may be filling 1200 bottles per minute, requires a high powered computer, and an expensive apparatus. Furthermore, the process described in this patent does not attempt to allow for the presence of foam above the liquid, despite the fact that such foam is inevitably present when many liquids, for example beer, are filled on high speed filling lines.

The present invention provides a process and apparatus for determining the HOF of a container; this process does not require the elaborate analysis and computing power required by the Schwartz et al. process, but can measure the HOF and allow for the presence of foam above the liquid. Preferred embodiments of the present invention can compensate for variations in the vertical height of the container, such as those which occur when the container is being transported by a flexible conveyor.

SUMMARY OF THE INVENTION

Accordingly, this invention provides a first process for determining the height-of-fill of a container comprising a body having an optically detectable feature, and contents filling the body up to a fill level, at least a measuring portion of the container extending from the optically detectable feature to the fill level being capable of transmitting electromagnetic radiation. This process comprises: illuminating at least the measuring portion of the container with electromagnetic radiation; forming an image of part of the measuring portion of the container; and analyzing the image by data processing means to identify:

(a) a first region having a first intensity that varies in accordance with the optically detectable feature; and (b) a second region having a second intensity associated with the contents below the fill level and which varies in accordance with the optical properties of the contents, and determining the distance between a point within the first region and the upper edge of the second region, thereby determining the height-of-fill.

This invention also provides a first apparatus for carrying out this first process and thus for determining the height-of-fill of a container comprising a body having an optically detectable feature, and contents filling the body up to a fill level, at least a measuring portion of the container extending from the optically detectable feature to the fill level being capable of transmitting electromagnetic radiation. This apparatus comprises: image-forming means arranged to form an image of part of the measuring portion of the container; and data processing means for analyzing this image, the data processing means being programmed to identify in the image:

(a) a first region having a first intensity that varies in accordance with the optically detectable feature; and (b) a second region having a second intensity, associated with the contents below the fill level, and which varies in accordance with the optical properties of the contents and to determine the distance between a point within the first region and the upper edge of the second region, thereby determining the height-of-fill of the container.

This first process and apparatus may hereinafter for convenience be called the "optical feature" process and apparatus of the present invention.

This invention also provides a second process for determining the height-of-fill of a container comprising a body, foamable liquid contents filling the body up to a fill level, and foam resting upon the liquid contents and extending from the fill level up to a foam level, at least an upper portion of the container extending from below the fill level to the foam level being capable of transmitting electromagnetic radiation. This process comprises: illuminating at least the upper portion of the container with electromagnetic radiation; forming an image of part of the upper portion of the container; and analyzing the image by data processing means to identify:

(a) a first region having a first intensity the varies in accordance with the optical properties of the foam; and (b) a second region having a second intensity that varies in accordance with the optical properties of the liquid contents, and determining the position of the boundary between the first and second regions, thereby determining the height-of-fill.

Finally, this invention provides a second apparatus for carrying out this second process and thus for determining the height-of-fill of a container comprising a body, foamable liquid contents filling the body up to a fill level, and foam resting upon the liquid contents and extending from the fill level up to a foam level, at least an upper portion of the container extending from below the fill level to the foam level being capable of transmitting electromagnetic radiation. This apparatus comprises: image-forming means arranged to form an image of the upper portion of the container; and data processing means for analyzing this image, the data processing means being programmed to identify in the image:

(a) a first region having a first intensity that varies in accordance with the optical properties of the foam; and (b) a second region having a second intensity that varies in accordance with the optical properties of the liquid contents, and to determine the position of the boundary between the first and second regions, thereby determining the height-of-fill.

This second process and apparatus may hereinafter for convenience be called the "boundary determining" process and apparatus of the present invention. It will be apparent to those skilled in the art of container measurement that a single physical apparatus may carry out both processes of the invention.

DETAILED DESCRIPTION OF THE INVENTION

Figure 6:
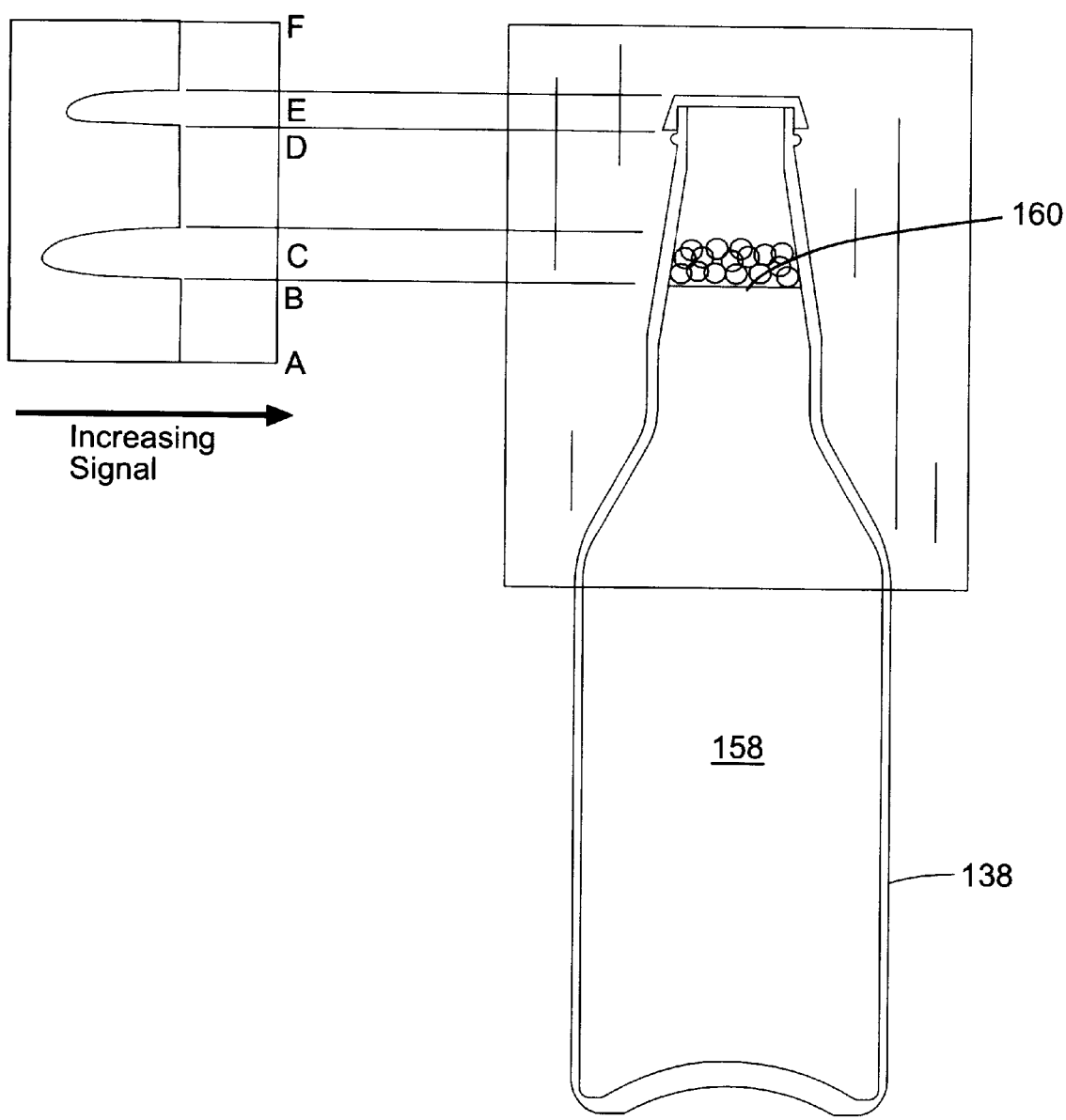
FIG. 6 shows the manner in which the bottle shown in FIG. 4 is backlit in the apparatus shown in FIG. 1, and a simplified version of the output from the apparatus correlated with the parts of an upper portion of the bottle.

As already mentioned, in the processes of the present invention a portion of the container is illuminated with electromagnetic radiation. While the illumination conceivably could come from natural lighting or the ambient lighting of the production facility, it is preferably provided in the form of the light source assembly, which could be highly directional in nature, diffuse, or some combination of both, depending on the geometry of illumination and the optical properties of the container under measurement. If the container being measured has lenslike properties and is to be transilluminated, diffuse lighting is preferred since highly directional light passing through a container that has significant optical power presents additional measurement challenges. Apart from the diffuse or directional considerations, the lighting may be continuous or strobed (for example, when the processes are used to measure HOF of a succession of bottles on a filling line, a strobe lamp could be arranged to flash when a bottle is detected at the measuring station), and may be positioned above or behind the bottle. Also, front lighting is possible and, if directional, its angle may be from above. While the exact nature of the lighting may take on various properties, it has been determined but it has already been found that ambient, back-lit diffuse, and front, angled directional lighting produce measurable results. The lighting is important for providing sufficient contrast between the transparent material of the container bottle and its contents, and there must be sufficient light energy to provide an adequate signal to noise ratio. Preferably, the lighting is such that it does not generate undesired spurious reflections off the bottle, and polarization techniques could be used to control spurious reflections. Preferably, the container is transilluminated (that is, the electromagnetic radiation is caused to pass through the portion of the container of which an image is to be formed) as illustrated in FIG. 6, but alternatively the container may be illuminated from the objective side (epi-illuminated, so that the image is formed by reflection or scattering from the contents of the container). In the former case, the contrast is due to the light transmitted through the empty space with the container compared with what is transmitted through the contents. In the latter case, the contrast is primarily from what is reflected from the container surface and what is behind it, either contents or empty space. Lighting sources include fluorescent bulbs, linear diode arrays, and fiber optic bundles.

Other forms of illumination possible are coaxial, where the radiation source and detector share a common optical path. When such coaxial illumination is used on a succession of containers passing along a filling line, the illumination would be directed by the container downstream as the container approached the detector station, upstream when it was past, and retro-reflected when the container was "on-axis", i.e., immediately in front of the detector. Alternatively, the illumination source and detector may be on the same side of the container with their axes arranged to intersect one another at a slight angle. These two schemes tend to reduce the possibility of unwanted or undesired signals from spurious reflections.

Finally, if spurious reflections cause problems, a "container present" detector can be introduced into the system to instruct the imaging device to take the required measurement only when the container is properly placed in the "measurement station".

The output of the present apparatus can be used for subsequent downstream applications such as "kicking out" defective bottles from the line, providing feedback to adjust upstream nozzle fill rates, providing statistics on process performance, or providing other process related functions, all as described herein.

The whole apparatus is preferably under the control of a central processor or computer system with touch screen control or a graphical user interface running under Microsoft Windows (Registered Trademark) or other suitable operating environment. The apparatus may be networked to interface with other factory control equipment.

A wide variety of containers may be used in the present processes. For example, the processes may be used to measure HOF in containers enclosing pulverulent or granular solid materials, such as fine chemicals, pharmaceuticals or foodstuffs, or materials comprising solids suspended in liquids. The containers themselves can vary widely in size and shape and may have the form of drums, carboys, flasks, jars and bottles. However, the present processes are especially intended for use with containers containing liquids, particularly bottles containing foamable liquids such as beer, and accordingly the detailed description of the processes hereinafter will mainly be with reference to such bottles of foamable liquid, since the necessary modifications of the processes and apparatus for use with other types of containers and contents will readily be apparent to those skilled in the container handling art.

The present processes require that the portion of the container of which the image is to be formed be transparent to the illuminating radiation. The bottles or other containers will generally be "transparent" in the visible region of the spectrum, but may also be transmissive in other regions, particularly the infra-red. As shown in more detail below with reference to FIGS. 24, 25, and 26, color glasses, such as the brown or green glasses often chosen to protect liquids such as beer from the effects of ultra-violet radiation, are transparent in at least the near infra-red, and hence measurement in the infra-red region is within the scope of the invention. Similarly, clear glass and many plastics used to form containers are transparent in the near ultra-violet down to at least 300 nm, and hence measurement in the ultra-violet region is also within the scope of the invention. In addition, other materials may be transparent to X-rays and thus X-ray radiation is contemplated to be within the scope of the invention.

Figure 25:
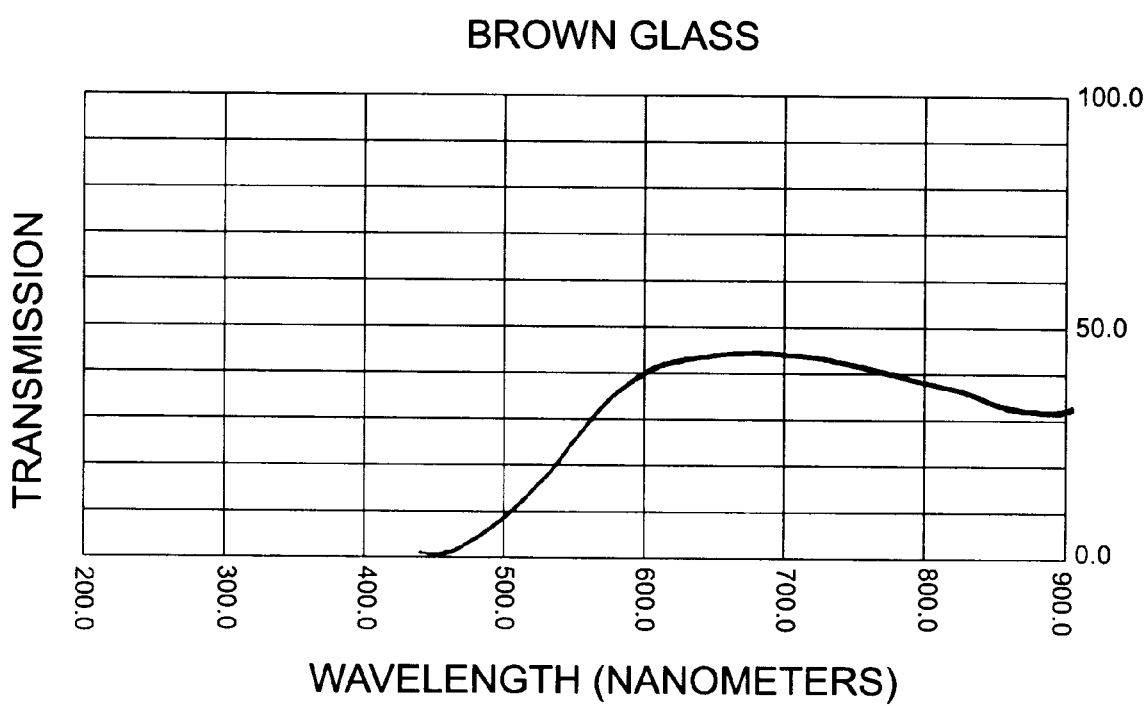

The term "transparent" as used herein does not imply complete or almost complete transmission of the electromagnetic radiation used; it is only necessary that the relevant part of the container transmit sufficient radiation to provide a discernible difference between the amounts of radiation transmitted through the various regions between which it is necessary to distinguish. For example, the FIG. 25 shows that brown glass has a transmission between 30 and 40% over the range of 800–900 nm, and this level of transmission is more than sufficient for the purposes of the present invention.

In the optical feature process and apparatus of the present invention, the optically detectable feature may be any feature of the container which can be distinguished by the imaging technique employed, although in practice it is important to choose a feature which has a substantially constant position on the container within the degree of precision required. The optically detectable feature may be, for example, the base of the container, a label, neckband or printing applied to the container, a bulge, lip or other protrusion or recess on the container, or a curved part of the container surface; such curved parts produce refraction effects which can readily be detected as contrasting areas in images of the container. Regardless of what feature is chosen, the optical feature process and apparatus have the important advantage that measuring HOF relative to the feature automatically compensates for vertical movements of the container such as may occur due to flexibility of a conveyor on which the container is being transported.

As already indicated, the present processes are especially intended for use with bottles or similar containers for foamable liquids such as beer, and such bottles or similar containers will typically have an opening at their upper end and a closure member (for example, a crown cap) substantially closing this opening. With such containers, the optically detectable feature preferably comprises at least part of the closure member. In most cases, the closure member essentially will not transmit the radiation used to illuminate the container, and it is convenient for the data processing means to determine the distance between the upper end of the first region of the image (associated with the top of the closure member) and the upper edge of the second region (associated with the liquid contents below the fill level). Measuring HOF relative to the closure member has the further advantage that the process can be used to detect not only containers having an improper fill level, but also containers having an improperly applied closure member. For example, if a crown cap is applied off-center so that it hangs lower on one side of a bottle than on the other, measuring the fill level relative to the cap in a bottle having the correct fill level will result in an abnormal reading because of the abnormal position of the cap, and the bottle can thus be rejected.

In all processes and apparatus of the present invention used with containers comprising a liquid having foam on the surface thereof, it is desirable that the thickness of the foam layer be measured and converted to its equivalent liquid volume. Thus, in the preferred form of the optical feature process and apparatus in which HOF is measured relative to the closure member, the analysis by the data processing means desirably identifies a first region of low radiation transmission associated with the closure member, a second region of high radiation transmission associated with the liquid, and a third region of low radiation transmission associated with the foam. It will be recognized that within each region, the signal will vary in accordance with the optical properties of the region's composition and the significant physical path length. With foam, for example, the variation is believed to be a function of the diameter of foam bubbles, the physical path which the bubbles occupy and the reflection properties of the bubbles at its surfaces, along with any scattering or absorption present. In many cases, it is preferred that the analysis determine the vertical height of the region associated with the foam, convert this vertical height to an equivalent vertical height of liquid (a preferred technique for effecting this conversion is described in detail below), and adjust the determined HOF to allow for the amount of liquid which would be generated if the foam were converted to liquid.

Any known form of imaging apparatus can be used to form the image needed in the present processes and apparatus; for example, one could use a video camera. However, preferably, a solid state detector is used. This may be a linear charged-coupled device (CCD) array or an area CCD array or some other suitable detector such as a scanner capable of generating a signal whose intensity over the desired image area (the measurement zone) varies as a function of the optical properties of that area. Preferably a linear CCD or other similar linear array of radiation detectors is employed; such linear arrays are inexpensive and analysis of the images produced from them is simpler and requires much less computing power than analysis of a two-dimensional image from a video camera. The present preference is for a silicon based linear CCD array of about 250 pixels although suitable results have been obtained with 128 pixels. Commercial linear CCD's can be is driven to operate at speeds (frame rates) that are sufficiently fast to provide a signal corresponding to a small segment of the bottle or other container as it moves down a conveyor on a filling line. Scan rates can be as high as about 15,000 frames per second which translates to a signal for at least every eighth of an inch (3 mm) of container travel.

The CCD or other imaging apparatus may be placed immediately adjacent the container under test. However, in many cases, it may be advantageous for radiation from the portion of the container being imaged to be passed through an imaging device so that the image of the portion of the container is formed upon the CCD or other imaging apparatus at a point spaced from the container. Using a "remote" CCD in this manner allows for more flexibility in the placement of the various parts of the apparatus (so that, for example, the apparatus may be more easily adjusted for use with various types of filling and other container-handling lines) and also reduces the risk that the CCD and associated electronics will be contaminated if, for example, a liquid-filled bottle on a filling line overflows, explodes or otherwise accidentally distributes its contents over apparatus adjacent the line. The image-forming device desirably is of a type, for example a zoom lens, which allows the magnification of the image formed to be varied, thus enabling a single CCD to be used with a variety of containers of differing sizes. In most cases, it is desirable that the magnification of the image-forming device be less than one, since forming a relatively small image allows a compact, relatively inexpensive CCD to be used.

As already indicated, the present apparatus is primarily intended to be used to measure the HOF of a succession of containers moving along a filling or similar container-handling line, and, in order that the HOF measurement is made at the proper point as each container passes the present apparatus, the apparatus desirably includes conveyor means for moving a plurality of containers in single file past a station, and container detection means for detecting the presence of one of the containers at the station. When the containers are beverage or similar bottles each having an opening at its upper end and a closure member substantially closing the opening, the container detection means conveniently comprises a radiation source arranged to project a first beam of radiation on to the closure member at the station and a radiation detector arranged to detect a second beam produced by reflection of the first beam from the closure member.

A preferred apparatus and process of the invention will now be described, though by way of illustration only, with reference to the accompanying drawings.

Figure 1:
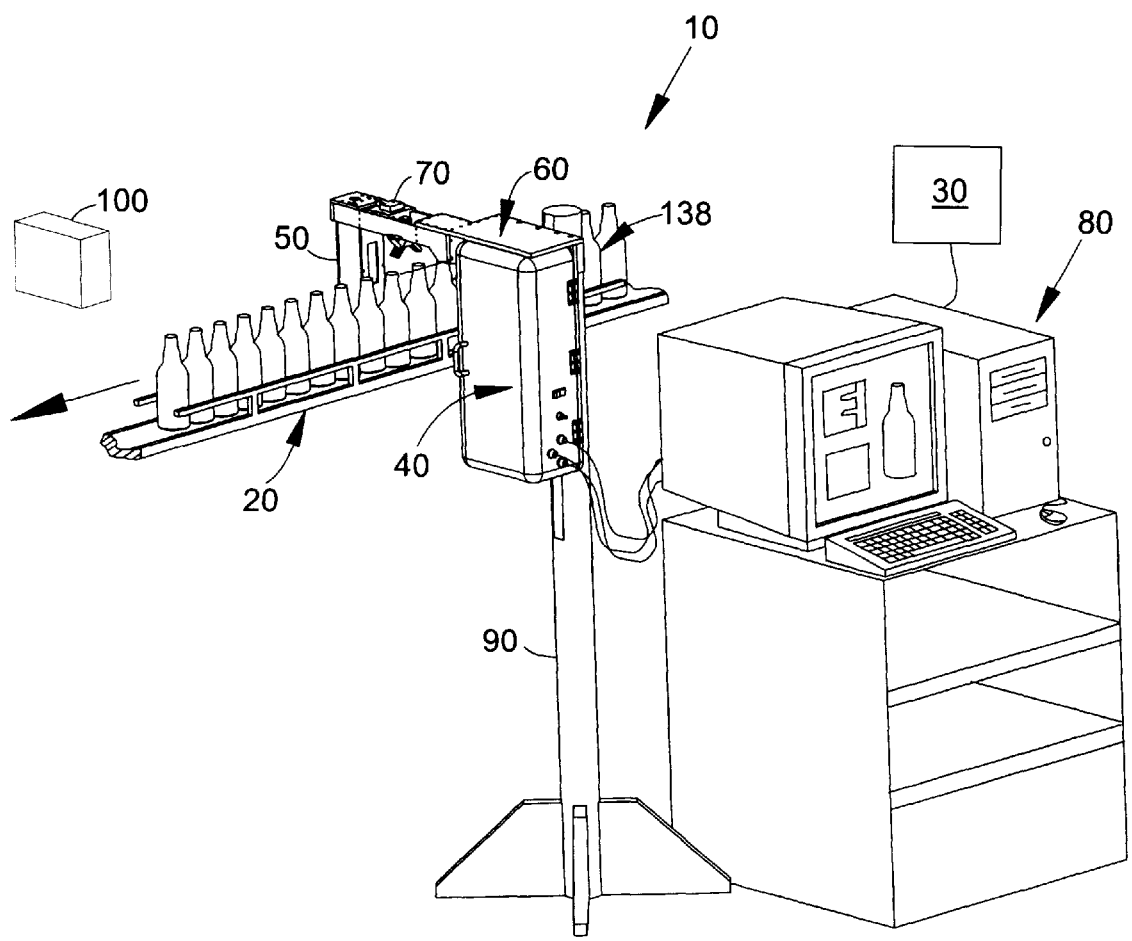
FIG. 1 of the accompanying drawings shows a diagrammatic perspective view of the apparatus of the present invention in use to measure height of fill in bottles passing along a filling line.
Figure 2:
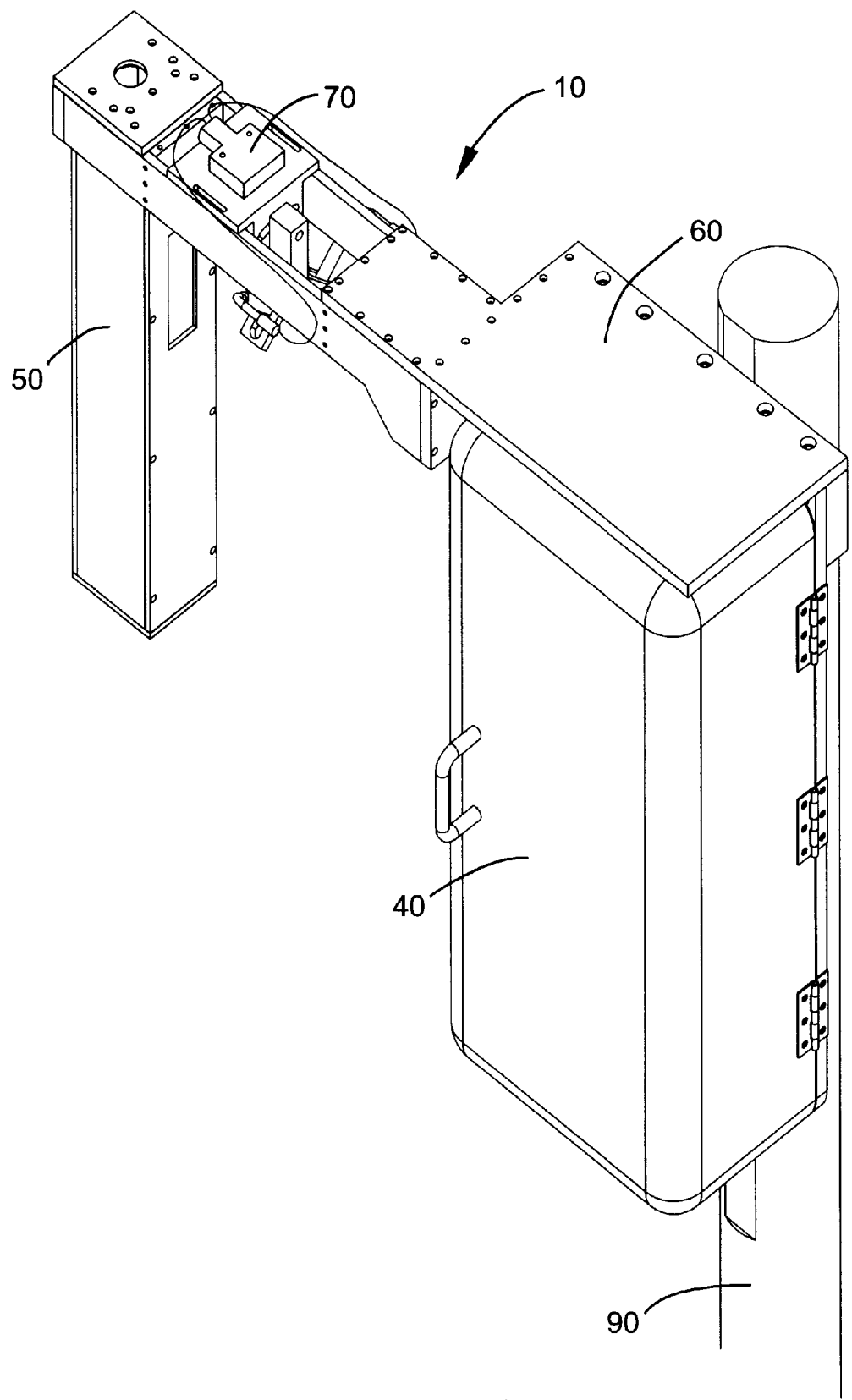
FIG. 2 shows an enlarged diagrammatic perspective view of the light source assembly, bridge assembly, bottle detect assembly and optical assembly of the apparatus shown in FIG. 1.

As best seen in FIGS. 1 and 2, the preferred apparatus of the present invention, which is pictured at a measurement station along a bottling line downstream of dispensing units, comprises several major components, the details of which will become readily apparent in what follows. More particularly, the apparatus provides an optically based, computer controlled, height of fill detection system and associated processes. The apparatus shown in FIG. 1 is generally designated 10, with the bottling line being generally designated 20 and the upstream dispensing units generally designated 30.

The apparatus 10 comprises four (4) main assemblies assembled on a 6 foot (1.83 m) crank stand 90 for accurate and consistent positioning, the first three assemblies being an optical head assembly or optical assembly 40, a light or illumination source assembly 50, and a bridge assembly 60 which connects assemblies 40 and 50, supporting and positioning them to straddle the bottling line 20. On top of the bridge assembly 60 is the fourth assembly, namely a bottle detect assembly 70, which operates to provide a signal indicating the presence of a bottle at a predetermined position between the light source assembly 50 and the optical assembly 40.

A computer system 80 (FIG. 1), preferably a workstation or Pentium (Registered Trademark) based personal computer system, provides control and exchange of signals and data between the operator and assemblies 30, 40, 50, 60 and 70. The computer system 80 preferably has a graphical user interface such as a Windows (Registered Trademark) NT or Windows 95 operating system, and the usual input and output devices such as a keyboard and mouse. Information from measurement of bottles is displayed in graphical form on a display monitor, or as numerical data or textual information or combinations of all three. Software and suitable algorithms are preferably provided in the "C" programming language although other languages may be sensibly used as substitutes.

The height of assemblies 40, 50, 60 and 70 with respect to the bottles can be adjusted via the crank stand 90. A bottle reject assembly, shown only schematically in FIG. 1 and generally designated 100, is provided adjacent the line 20 downstream from the apparatus 10, to allow for rejection from the line 20 of bottles which the apparatus 10 indicates to be unsatisfactory.

As best seen in the flow chart of FIG. 3, system 10 is first initialized at 102 by an operator who provides proper height positioning and informs the system about the type of bottles, manufacturer, glass color, height of fill specifications, the number of cappers and fillers upstream at the dispensing units 30, and the parameters of the bottles that are to be measured and how the measured information is to be presented and subsequently used. This information is preferably selected via drop down menus and icons provided as part of the system software. Information about specific manufacturers' bottles and their specific specifications, shapes, contents and other important parameters are preferably selected from on-board look-up tables (LUTS) residing in memory or, alternatively, loadable as needed from peripheral devices.

Following system initialization, a signal is given at 104 to start the measurement sequence, after which the bottle detect assembly 70 is brought into operation to provide a signal that a bottle is present in its measurement location. The software loops through a bottle detect operation 106 until the bottle detect assembly 70 indicates the presence of a bottle, whereupon, at 108, a command is issued to the optical assembly 40 to start scanning a predetermined section of a bottle; scanning continues over a period of time during which data is acquired and analyzed in real time or stored and then analyzed a predetermined time later.

The data acquired during the scan are then analyzed in a data analysis section 110 of the software. Depending on what parameters were selected during initialization, the acquired scan data may be analyzed to determine cap position, fluid height, foam presence, quality, and/or correction, height of fill, container shape, color, and feature integrity, or container content color features and transmission characteristics. Thus, while the primary purpose of the invention is height of fill determination, it is clear that the apparatus and process can also serve as an inspection device for other types of container properties.

From the data analysis section 110, the software proceeds to a decision block 112, where the determined HOF is compared with the acceptable limits, and this information is used to determine if a bottle is acceptable or not. If the HOF is deemed unacceptable, the software proceeds, at 114, to send a reject signal to the bottle reject assembly 100, which automatically kicks the rejected bottle off the line 20 by well-known means such as by pneumatic control. If the HOF is found satisfactory at 112, or after generating the rejection signal at 114, the software proceeds to a further decision block 116, which tests whether the operator has enabled process control calculations. If so, the software proceeds at 118 to carry out process control calculations, which are shown in more detail on the right-hand side of FIG. 3. If process control calculations have not been enabled, or after they have been completed, the software loops back to the bottle detect block 106.

Figure 3:
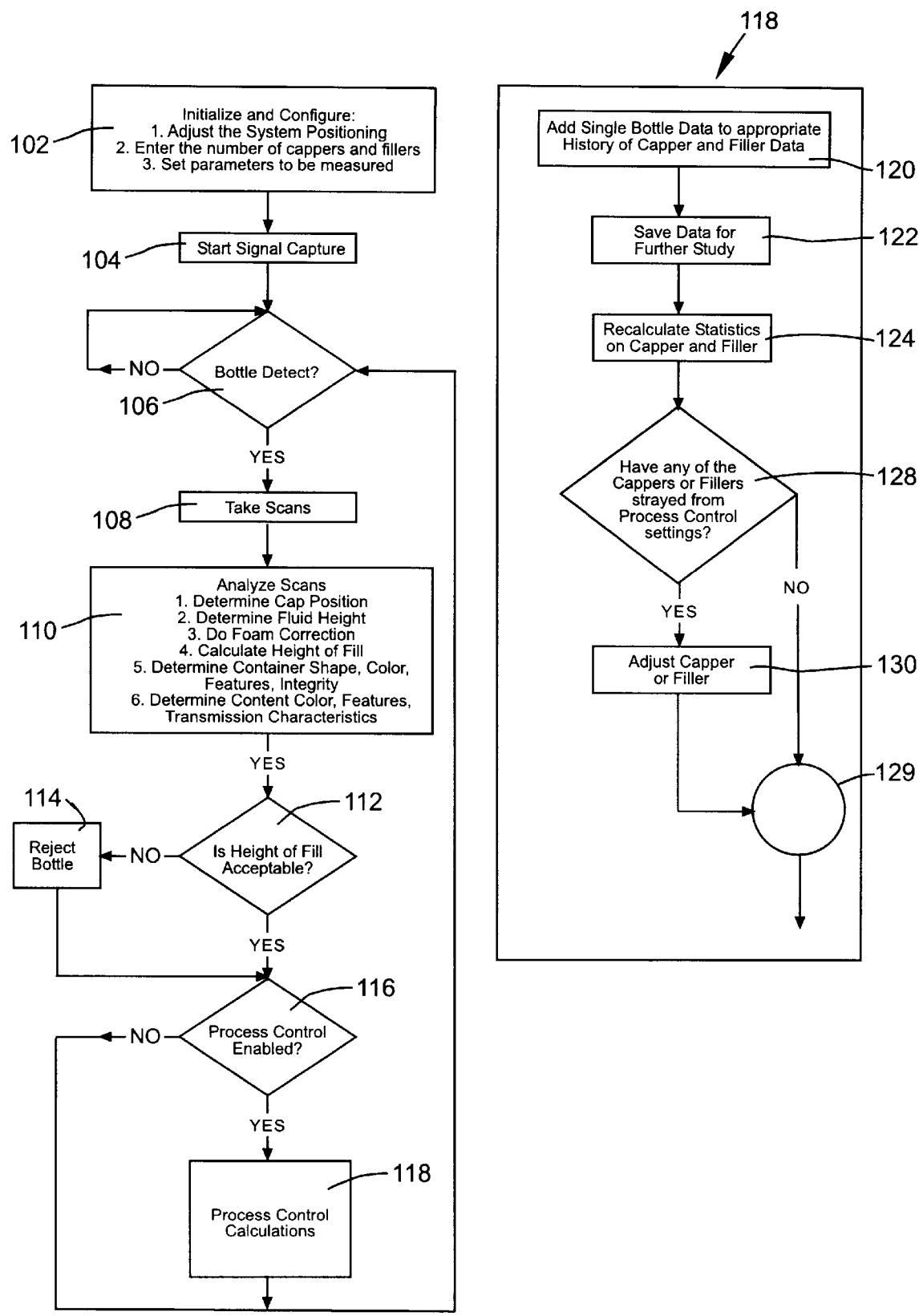
FIG. 3 is a flow diagram of the software used in the apparatus shown in FIG. 1.

The process control calculation block 118 is shown in more detail on the right-hand side of FIG. 3, which shows that this block includes a single bottle data block 120 at which the data for the bottle just measured are added to cumulative data representing the history of the capper and filler units which processed this bottle. Next, at 122, the updated cumulative data are saved for later use, and then, at 124, the software recalculates statistics for the relevant capper and filler units. The software then proceeds, at 126, to determine whether the statistics calculated at 124 indicate that any of the capper or filler units have deviated from their proper process control settings. If so, the software, at 128, effects adjustment of the deviating capper or filler; this adjustment may be effected automatically, or an appropriate signal may be given on the monitor of the computer system 80 (see FIG. 1) to advise the operator of the need to carry out the adjustment. At 129 the process continues.

It will thus be seen that the present apparatus may be configured to operate stand alone or as an integral part of a production line in which it serves to provide process control feedback and quality statistics.

Figure 4:
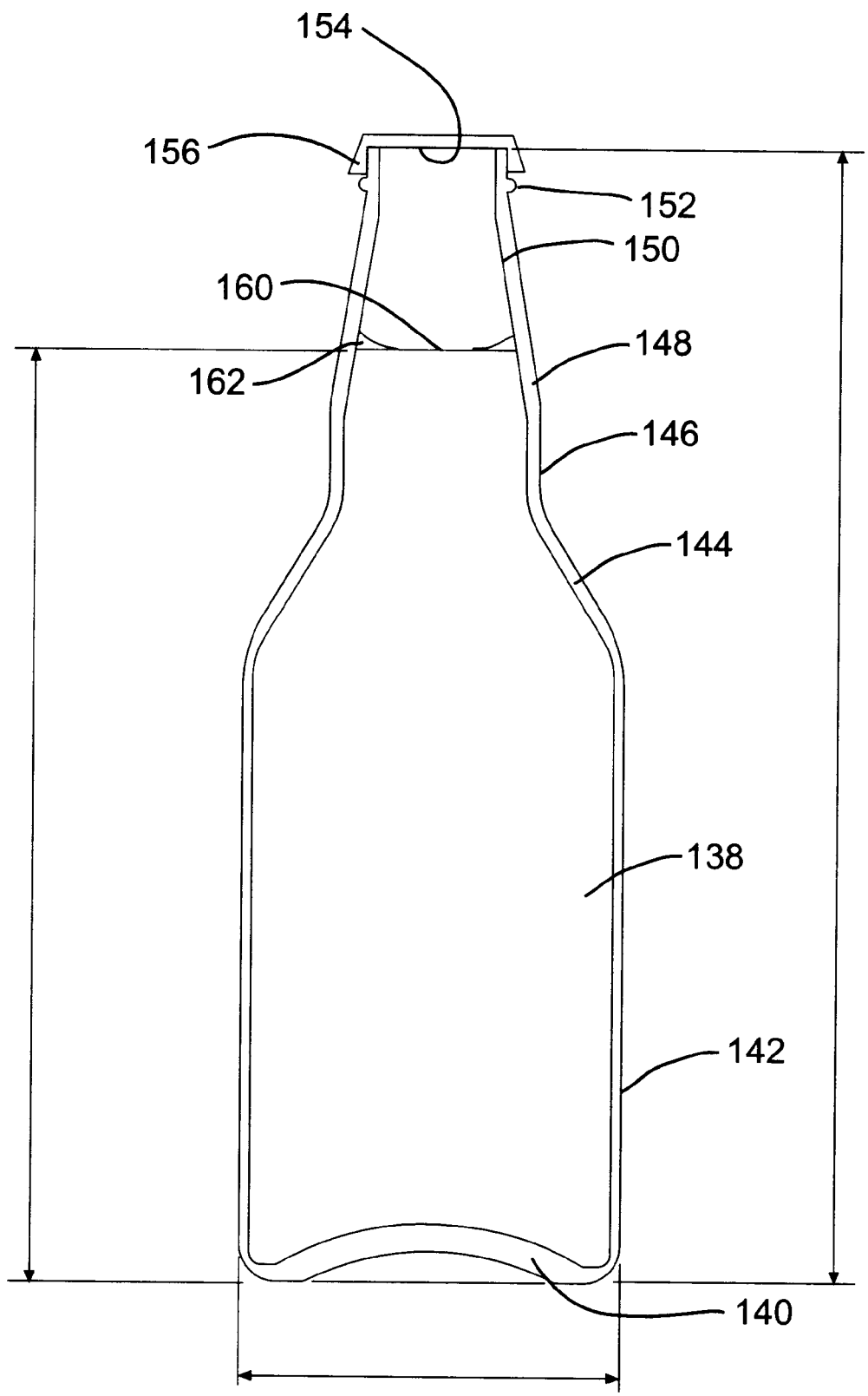
FIG. 4 is a diagrammatic vertical section through the axis of one of the bottles shown in FIG. 1.

As best seen in FIG. 4, which shows a vertical section through one of the bottles 138 used on the line 20 (see FIG. 1), each bottle has a circular, upwardlyconvex base 140, upwardly from the periphery of which extends a cylindrical sidewall 142. At the upper end of this sidewall 142, the bottle narrows in a frustoconical section 144, which is surmounted by a second cylindrical section 146. This section 146 is in turn surmounted by a second frustoconical section 148 and a cylindrical neck section 150. The cylindrical neck section 150 has a bead 152 integrally formed on its outer surface and defines an opening 154 at its upper end, this opening being (in a properly processed bottle) completely closed by a closure member in the form of a crown cap 156. The bottle is filled with beer 158 up to a fill level 160 lying within the second frustoconical section 148; note the presence of a meniscus 162 where the beer wets the interior wall of the frustoconical section 148. The maximum diameter of the bottle 138 is 2.5 inch (63 mm) and its maximum height, measured from the lowest point on the base 140 to the top of the crown 156 is 7.65 inch (194 mm), with the fill level 160 being approximately 6.1 inch (155 mm) above the lowest point on the base 140. Note that FIG. 4 shows the bottle 138 in its "quiet" state after all foam produced during the filling operation has collapsed. As explained in more detail below, the process of the invention is normally carried out while a substantial amount of foam is still present above the fill level 160, as shown in FIG. 6

The apparatus 10 (see FIG. 1) has the capability of measuring the fill level 160 relative to the crown 156 and/or the base 140 of the bottle 138 to a tolerance of ±1 mm. Indeed, if desired, measurement of the fill level 160 dould be effected relative to any optically detectable feature of the bottle 138, for example the curved section at the junction of the cylindrical sidewall 142 and the frustoconical section 144, or to an arbitrary reference point external to the bottle or an feature added upstream of the measurement point. The process may also include measurement of the effects of foam, and other container features may be analyzed such as bottle cap integrity, container shape and color, and color or other features of the contents, such as foam quality in the case of those beverages such as beer with foam presence and appearance requirements. The process also has the ability to determine the presence or absence of crowns, poorly applied crowns, crown defects, foam thickness, and foam density. All of the acquired information gathered by way of measurement may be downloaded as previously stated for purposes of providing production statistics and/or feedback control of upstream dispensing stations.

Figure 5:
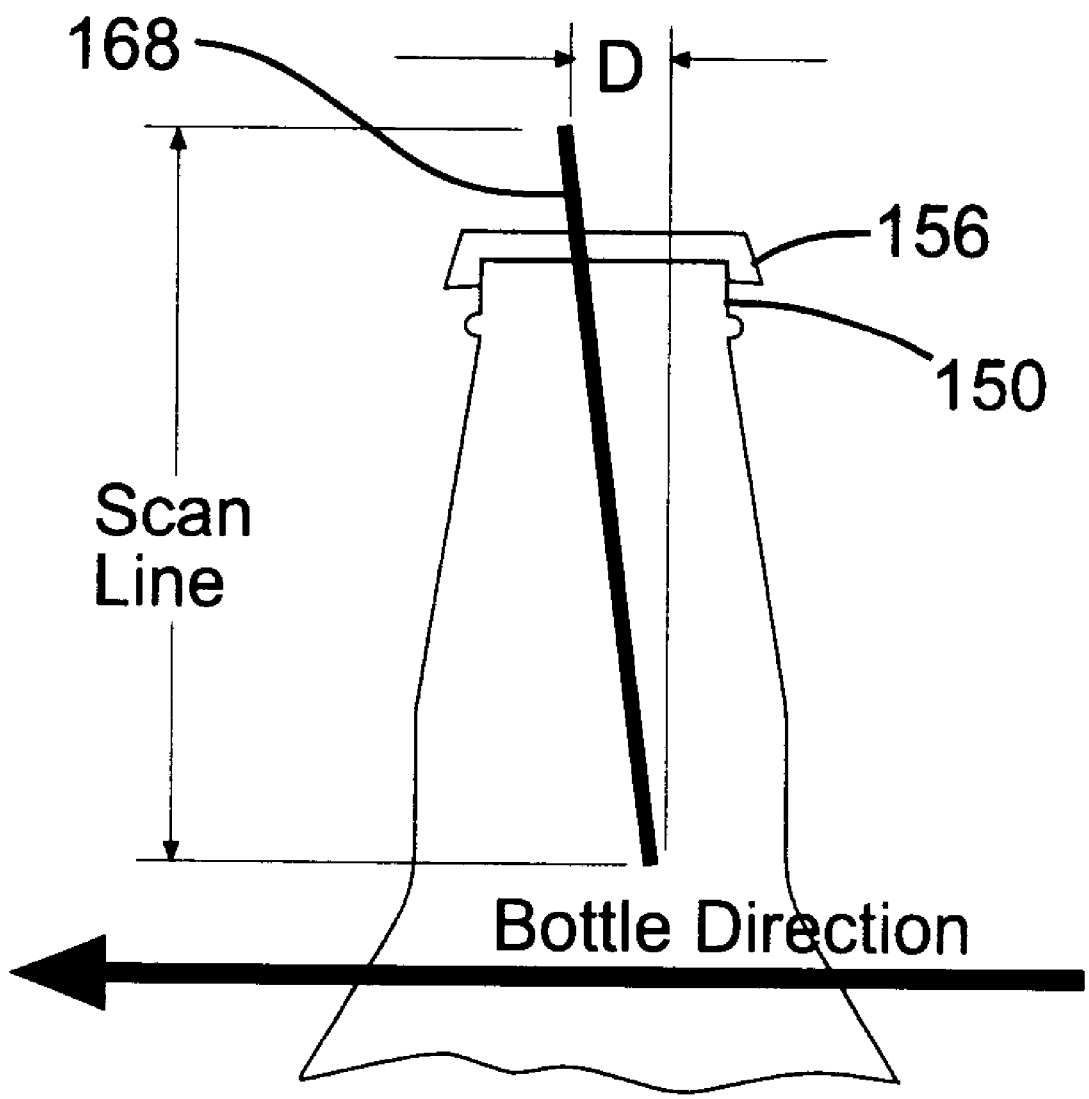
FIG. 5 shows the manner in which the apparatus shown in FIG. 1 forms an image of the upper part of the bottle shown in FIG. 4.

However, as discussed above, it is generally preferred to carry out measurement of the fill level 160 relative to a point on the crown cap 156, conveniently the top thereof, since measuring relative to the cap only requires imaging of a relatively small part of the bottle; for example in the bottle shown in FIG. 4, measurement relative to the cap only requires imaging about a 2 inch (51 mm) portion of the bottle, whereas measurement relative to the base would require imaging more than 6 inches (152 mm) of the bottle. The fill level 160, and thus the HOF, is preferably measured from the center of the neck since that measurement establishes the nominal fluid volume, and the volume due to the presence of the meniscus can be accounted for, depending on the degree of precision required. Foam may also reside above the fluid as shown in FIG. 6, and can be measured and converted to its equivalent fluid volume if specifications demand such precision. A method for doing this will subsequently be described. Note that although, as described below, the apparatus 10 shown in FIG. 1 uses a linear array of radiation detectors arranged to image a vertical strip of the upper part of the bottle 138 (see FIG. 5), since the imaging operation is conducted while the bottles 138 are moving horizontally along the line 20 (as indicated by the arrow) at substantial velocity, and since the detectors of the linear array are sampled sequentially during each scan, the effective scan line 168 on which measurements are taken is inclined at a small angle to the vertical. As explained below, the apparatus 10 is designed for use on a filling line with a capacity of 1200 bottles per minute (20 per second). Since each bottle has a diameter of 2.5 inch (63 mm), and since the bottles pass the apparatus 10 with their side walls 142 (FIG. 4) touching each other, the bottles pass the apparatus at 50 inches per second (1.27 m sec$^{-1}$). Most desirably, the two ends of this scan line 168 are separated horizontally by a distance D of not more than about 0.1 inch (2.5 mm) to ensure that the scanning occurs only in the central portion of the neck of the bottle is positioned adjacent the optical assembly 40. To ensure that this horizontal separation does not exceed 0.1 inch (2.5 mm) requires that a single scan be completed within 1/500th of a second, which for a 128 pixel linear array requires a clock speed of at least 64 kHz. Modern linear CCD's can reach this rate without undue difficulty. In practice, it has been found that a horizontal distance D of 0.2 inch (5 mm) can be tolerated, which requires a scan rate of 32 kHz. As described below, the linear CCD of the apparatus 10 operates at this scan rate. Provided that the bottle detect assembly 70 ensures that the scan occurs while a bottle is accurately aligned with the optical assembly 40, the slight inclination of the scan line 168 has no significant effect on the operation of the apparatus 10.

Figure 7:
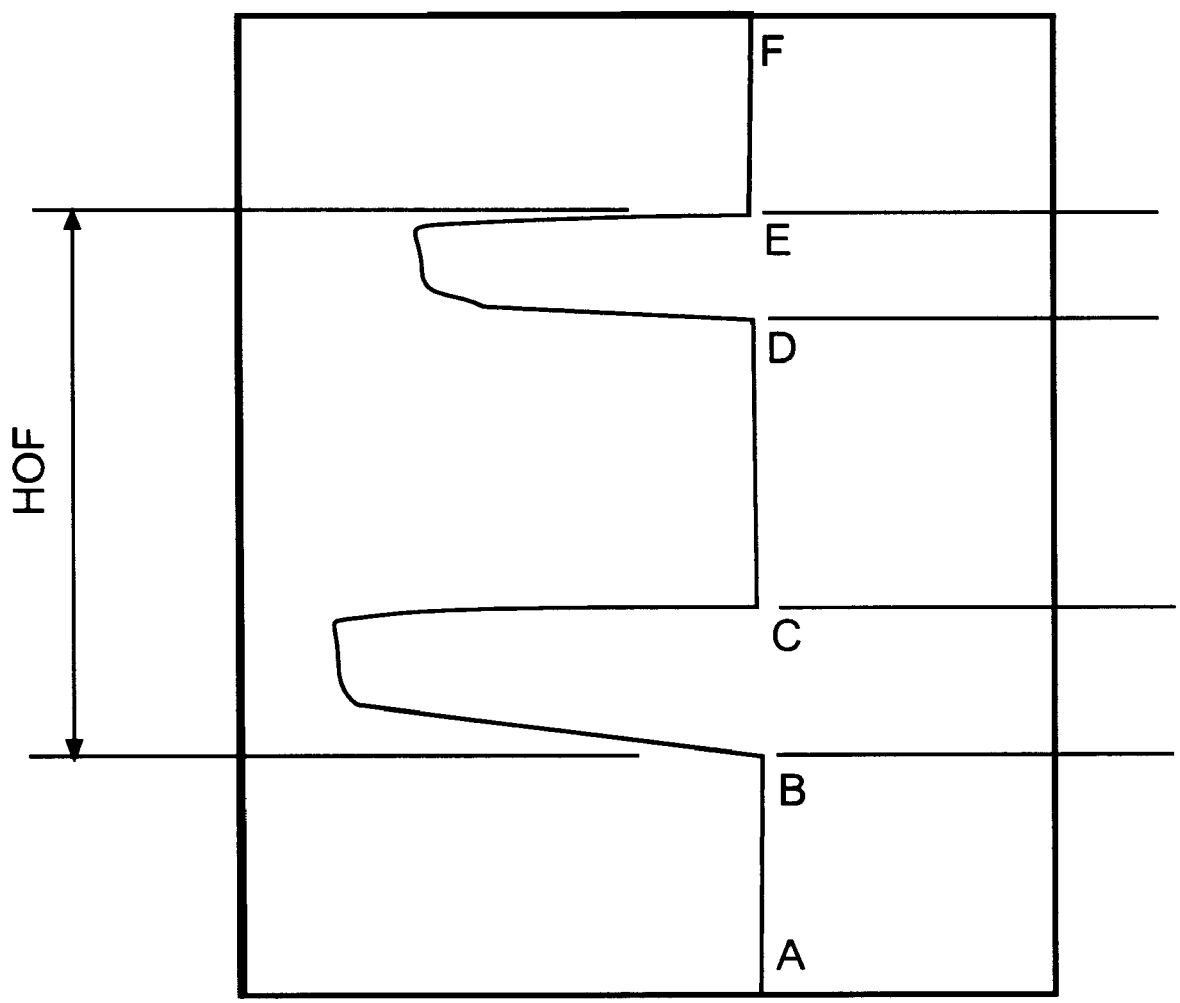
FIG. 7 shows an enlarged version of the output shown in FIG. 6.

As already indicated, the apparatus 10 (FIG. 1) is designed to take linear scan images of radiation transmitted through the bottle under test. The resulting digital image shows the cap and foam thickness/fill height as reductions of the signal level, and a provides the corresponding output to the computer display. FIG. 6 shows the bottle 138 of FIG. 4 and a typical (but somewhat simplified) computer display correlated with the corresponding parts of the bottle; the bottle is shown with foam above the liquid as is normal when the HOF of the bottle is measured immediately after filling, as shown in FIG. 1, while FIG. 7 shows an enlarged version of the output signal shown in FIG. 6. Here, the signal is shown saturated through the bottle and liquid below the fill level 160, in the region designated AB in FIG. 6. However, the signal need not be saturated with suitable gain adjustment as explained hereinafter. The signal diminishes at the meniscus 162 immediately above B, and then drops rapidly where foam is present above the fill level, in the region designated BC in FIG. 6. As shown, when foam is present in the bottle neck, the region BC corresponding to the foam thickness provides a signal that varies in accordance with the optical properties of the foam, so the presence of foam in a bottle is a benefit in determining HOF. However, the amount of foam present, if its presence is appreciable in terms of its equivalent fluid volume, has to be accounted for by suitable conversions (described below) where volumetric specifications demand precision. If no foam is present, the HOF is still measurable with the foam thickness approaching zero.

Above the foam, in the region designated CD in FIG. 6, only gas is present within the neck of the bottle and the signal again becomes saturated. The signal then drops to a very low value in the region designated DE, corresponding to the radiation being blocked by the opaque cap 156 (see FIG. 4). Finally, above the cap the bottle ceases to obstruct the radiation being detected and the signal again becomes saturated in a region designated EF.

As indicated in FIG. 7, in the preferred process of the invention, the HOF is measured by determining the distance BE, namely the distance between the lower edge of the foam region BC and the upper edge of the cap region DE. It will be seen that, if the layer of foam is so deep that it completely fills the space between the liquid and the cap, the region CD will disappear from the signal and the regions BC and DE will merge to form a single low signal region. However, the distance BE can still be readily determined, since this distance corresponds to the total height of the merged region. Furthermore, it will be apparent to those skilled in software image analysis that software can readily be written which will automatically analyze the signal and determine the distance BE, whether or not the high signal region CD is present or present in different form because occupied by foam.

Figure 8:
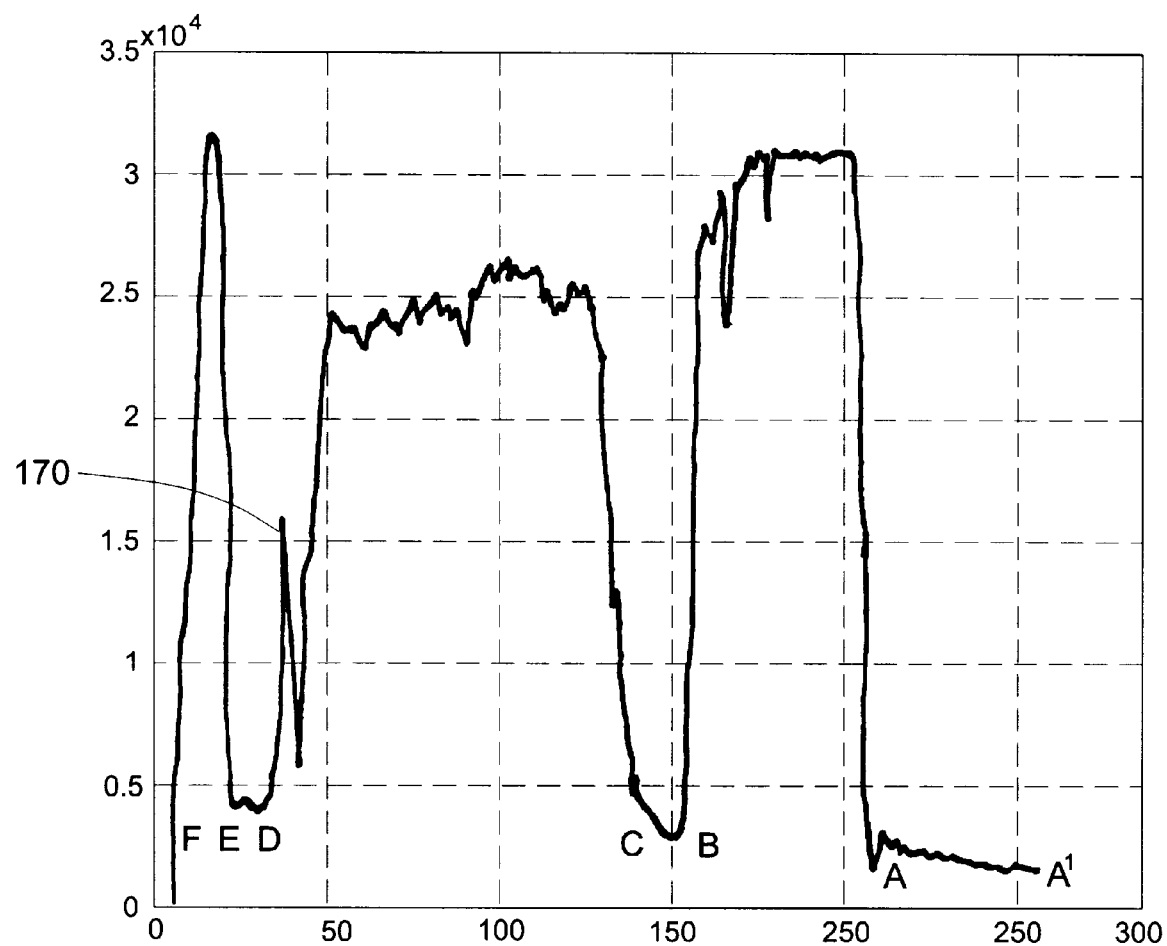
FIG. 8 shows an actual output similar to that of FIG. 7 but recorded at a lower amplification so that the output does not reach its maximum value in the part of the bottle above the foam but below the cap.
Figure 9:
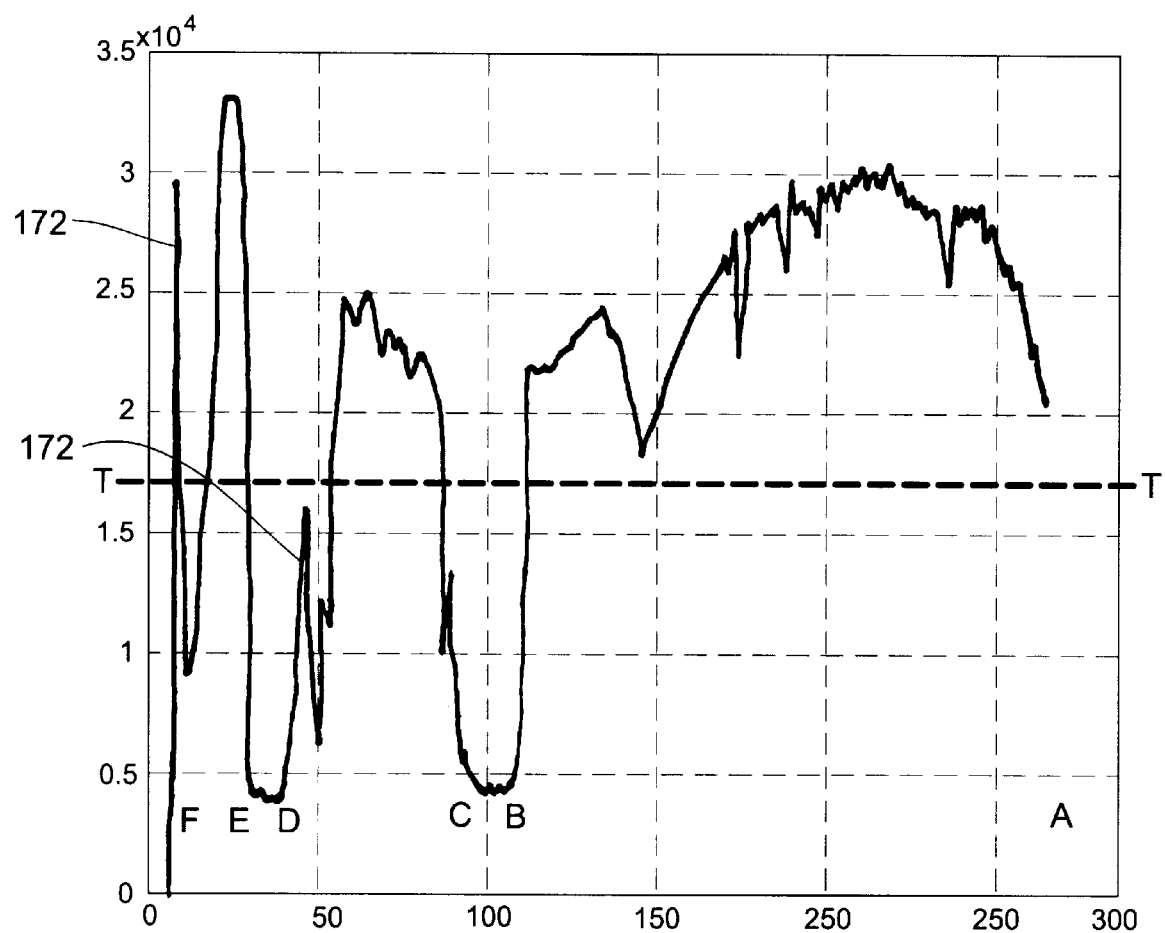
FIG. 9 shows an actual output similar to that of FIG. 8 but recorded at a still lower amplification so that the output does not reach its maximum value in the region of the bottle containing liquid.

As already indicated, the signal shown in FIGS. 6 and 7 is somewhat simplified for purposes of illustration. In contrast, FIG. 8 shows an actual display of a signal which is generally similar to that shown in FIGS. 6 and 7 in that the detector is saturated in the regions AB and EF corresponding to the bulk liquid and the space above the cap respectively (the various regions of the signal are indicated in FIGS. 8 and 9 using the same reference letters as in FIGS. 6 and 7). The only features of the signal shown in FIG. 8 which are not present in FIGS. 6 and 7 are a region AA', which is due to an essentially opaque label present on the bottle, a more gradual change in signal value near C in the upper part of the foam layer (which is due to partial collapse of the foam, with consequent reduction in the number of liquid films present to scatter the radiation), and a sharp peak 170 present in the region DE and due to refraction effects from a bead similar to the bead 152 shown in FIG. 4. It will be seen that, despite these extra features, the desired distance BE can readily and accurately be measured from the signal shown in FIG. 8.

The signal shown in FIG. 9 differs from that shown in FIGS. 6, 7 and 8 in that the detector is not saturated in region AB. The signal shown in FIG. 9 also does not have a region corresponding to the "label" region AA' in FIG. 8, but does have a sharp peak 170' similar to the peak 170 shown in FIG. 8 and produced in the same manner. Finally, the signal shown in FIG. 9 includes an additional peak 172 in the region above the cap, which may be due to reflection of radiation from the cap. As in FIG. 8, the desired distance BE can readily and accurately be measured from the signal shown in FIG. 9.

From FIGS. 6–9, it will be seen that proper measurement of HOF can be achieved using signals which are saturated over certain regions of the bottle, and using signals which are not saturated, although the former may have certain advantages in eliminating various minor variations in signal level and thus simplifying computerized identification of the various regions. Saturation of the signal can be achieved by control of the light level, electronic amplifier gain, or by setting a software signal threshold.

As already indicated, the signals from the optical assembly, such as those shown in FIGS. 6–9, are fed to a signal processor that calculates the fluid level from the signal properties and the adopted reference position. The result may be displayed as a number, as a go/no-go output, or on a graphic display such as the computer monitor of FIG. 1, showing upper and lower reference limits, say R1 and R2, and the actual HOF with respect to those reference points.

Before describing the various components of the apparatus in more detail, it is considered helpful to set forth a list of a set of typical specifications which this apparatus was required to meet in a typical bottling line application:

1. Image measurability and consistency at 1200 bottle per minute speed.
2. Digital output to host unit for data compilation, and bottle acceptance.
3. HOF measurement to ±1 mm.
4. Foam thickness integration into HOF calculation.
5. System Packaging build to National Electronic Manufacturers Association (NEMA) 4 standards.
6. System wiring and interconnect using standard NEMA ( ) 4× rated cabling. This system is wired to interface with the Host computer, with easy interconnect for ease of modification.
7. Image consistency through several bottle color types.
8. Object area to provide adjustability to accommodate varying bottle heights.

The Hardware Specification uses a 133 Mhz Pentium computer as the host machine, and the C language to develop driving and compilation software. While this is a typical example, it should be clear that the scope of the invention is much broader than the use of the following elements in the combination shown. Where desired to assess color characteristics of bottles or their contents or both, it will be understood that color CCD's may be employed and where shape or other geometric features are contemplated two-dimensional arrays may be sensibly used.

Figure 10:
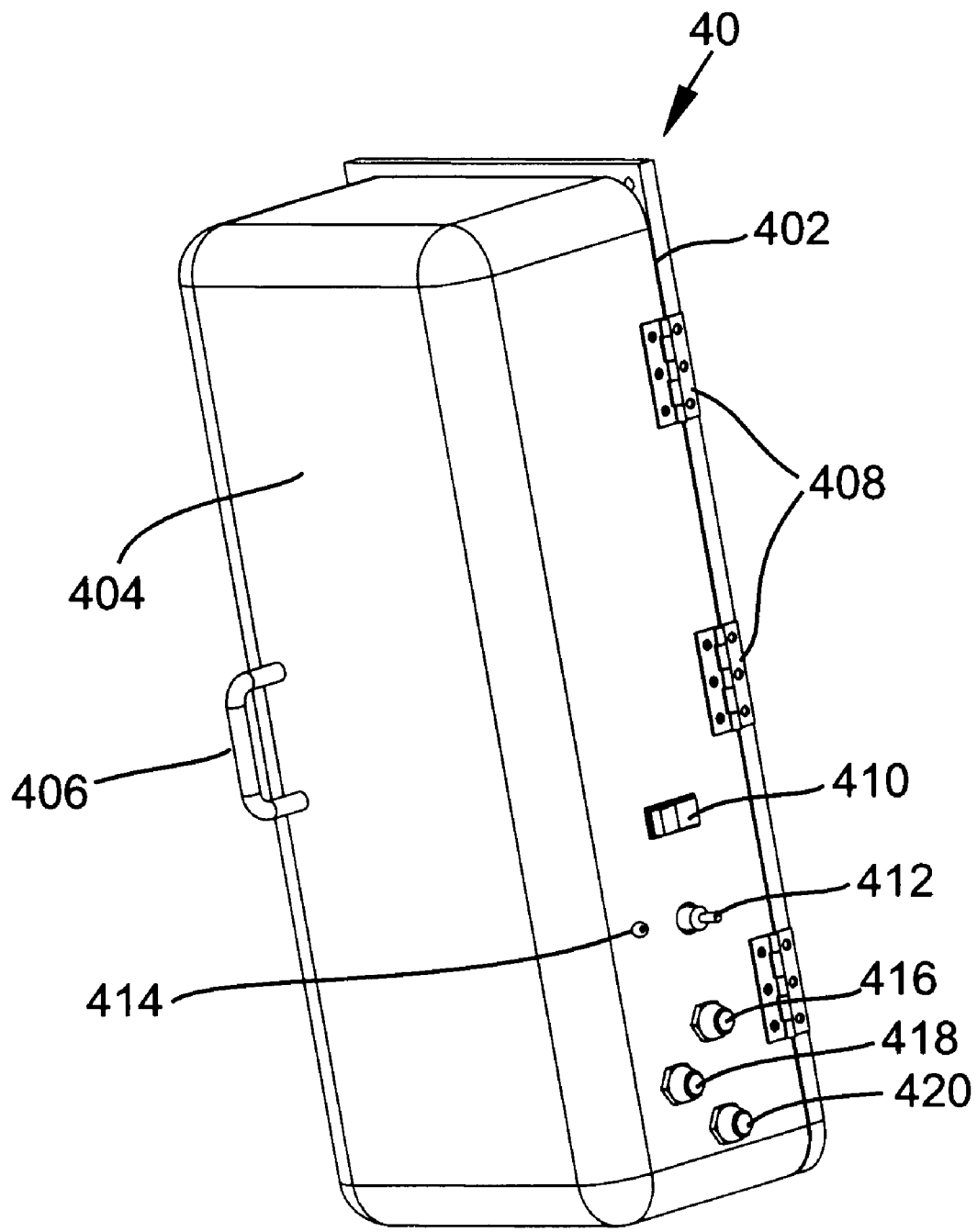
FIG. 10 shows a diagrammatic perspective view of the optical assembly shown in FIGS. 1 and 2 from above and to one side.
Figure 11:
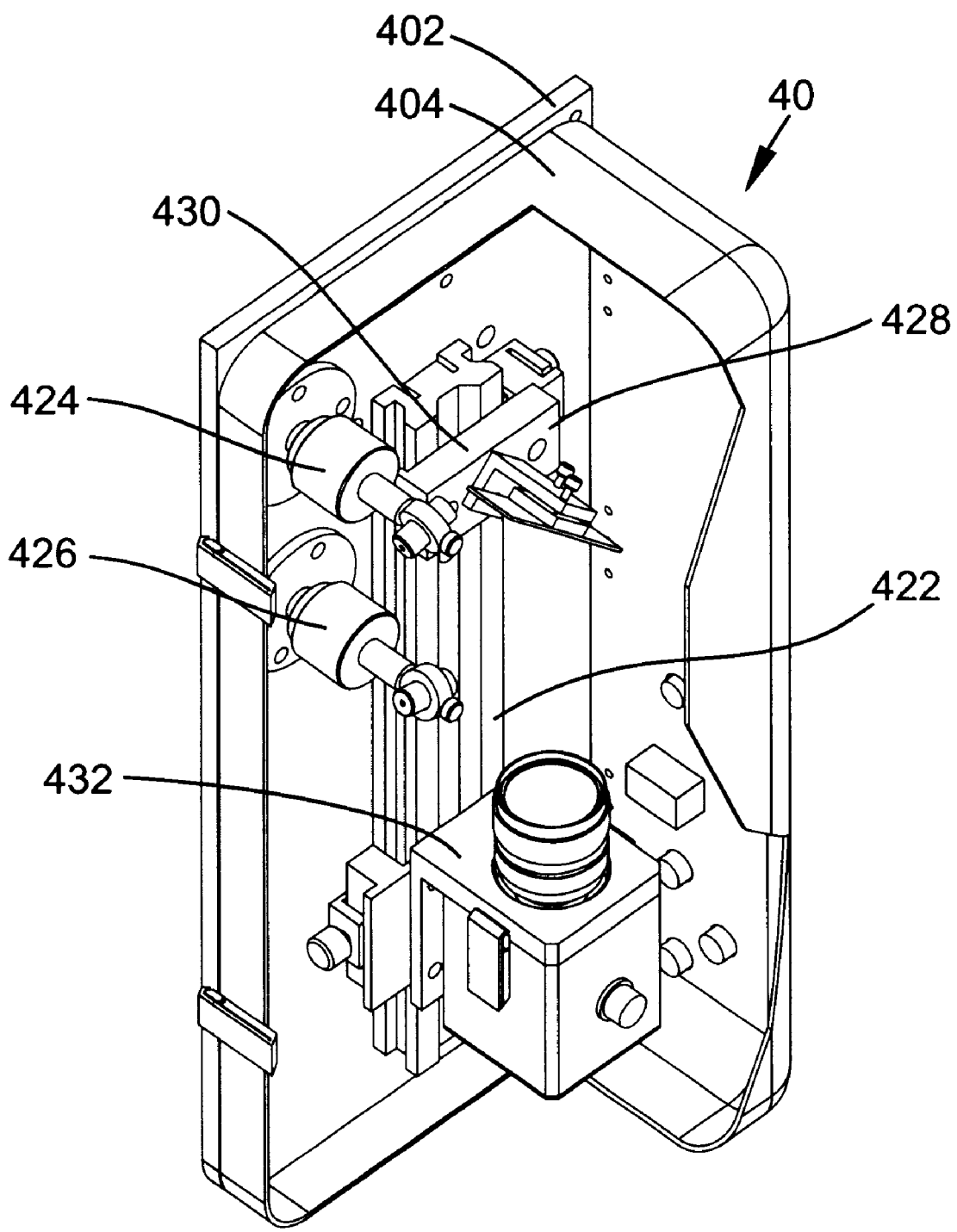
FIG. 11 shows a diagrammatic three-quarter view of the optical assembly of the apparatus shown in FIG. 10 from, above and to one side, with part of the housing of the assembly broken away to show the internal components thereof.
Figure 12:
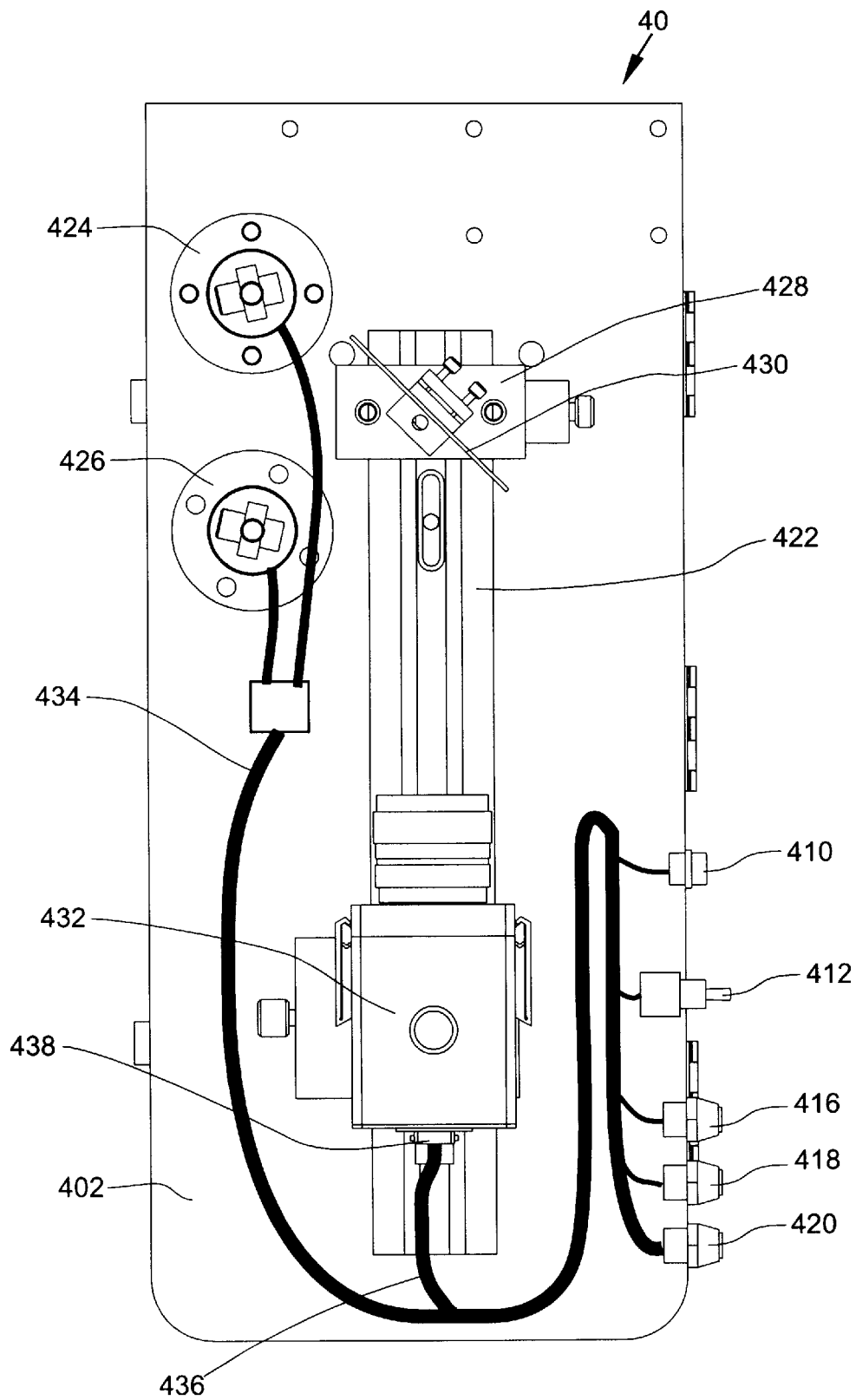
FIG. 12 shows a diagrammatic rear elevation of the optical assembly shown in FIGS. 10 and 11 with part of the housing of the assembly broken away to show the internal components, including the cabling, thereof.

As shown in FIGS. 10, 11 and 12, the optical assembly 40 comprises a base plate 402 on which a manually-operable door 404 having a handle 406 is mounted by means of hinges 408. This door 404 protects and provides access to the internal optical and electrical components of the optical assembly 40, and, together with the base plate 402, forms a substantially cuboidal housing for the optical assembly 40. Note that the base plate 402 lies adjacent the crank stand 90, to which it is attached by two (2) 2¼ inch (57 mm)-20NC machine screws. Mounted on the door 404 are a system power switch 410, a laser power switch 412, a laser power indicator light emitting diode (LED) 414 a power connector 416, a signal connector 418 and a detect connector 420, which is connected to the bottle detect assembly 70 in a manner described below; the power and signal connectors 416 and 418 are Turck connectors. The switches and connectors 410–420 are omitted from FIGS. 1 and 2 for ease of comprehension, but by comparing FIGS. 2 and 10, it will be seen that these switches and connectors 410–420 are located on the "back" of the optical assembly 40, i.e., on the surface of the door 404 facing directly away from the light source assembly 50, thus providing maximum protection of these components from any contamination caused by defective bottles on the line 20.

As shown in FIGS. 11 and 12, an optical rail 422 is mounted vertically in the center of the base plate 402 and two locating lasers 424 and 426 are mounted vertically one above the other in a side portion of this base plate. Lasers 424 and 426 comprise part of an optical rangefinder that allows the optical head assembly spacing from a bottle to be properly set. To achieve this both lasers are aimed to a point of convergence. As a bottle or a surrogate bottle is moved toward and away from this point, two spots will appear on the surface of the bottle when the separation distance is incorrect. But adjustment of the spacing in the proper direction narrows the separation between the laser beams, and when perfect, they exactly overlap at which point the spacing is correctly set. A mirror assembly 428, including a mirror 430 inclined at 45° to the vertical, is mounted on the rail 422 adjacent the lasers 424 and 426, while a camera assembly 432 is mounted on the lower end of the rail 422 so that its optical axis is pointing vertically upwardly and intersects the center of the mirror 430. As may be seen by comparing FIGS. 2 and 11, radiation from the light source assembly 50 passes through the bottles on the line 20 and through a window (not shown) in the side of the door 404 facing the light source assembly, is reflected from the mirror 430 and enters the camera assembly 432.

Figure 13:
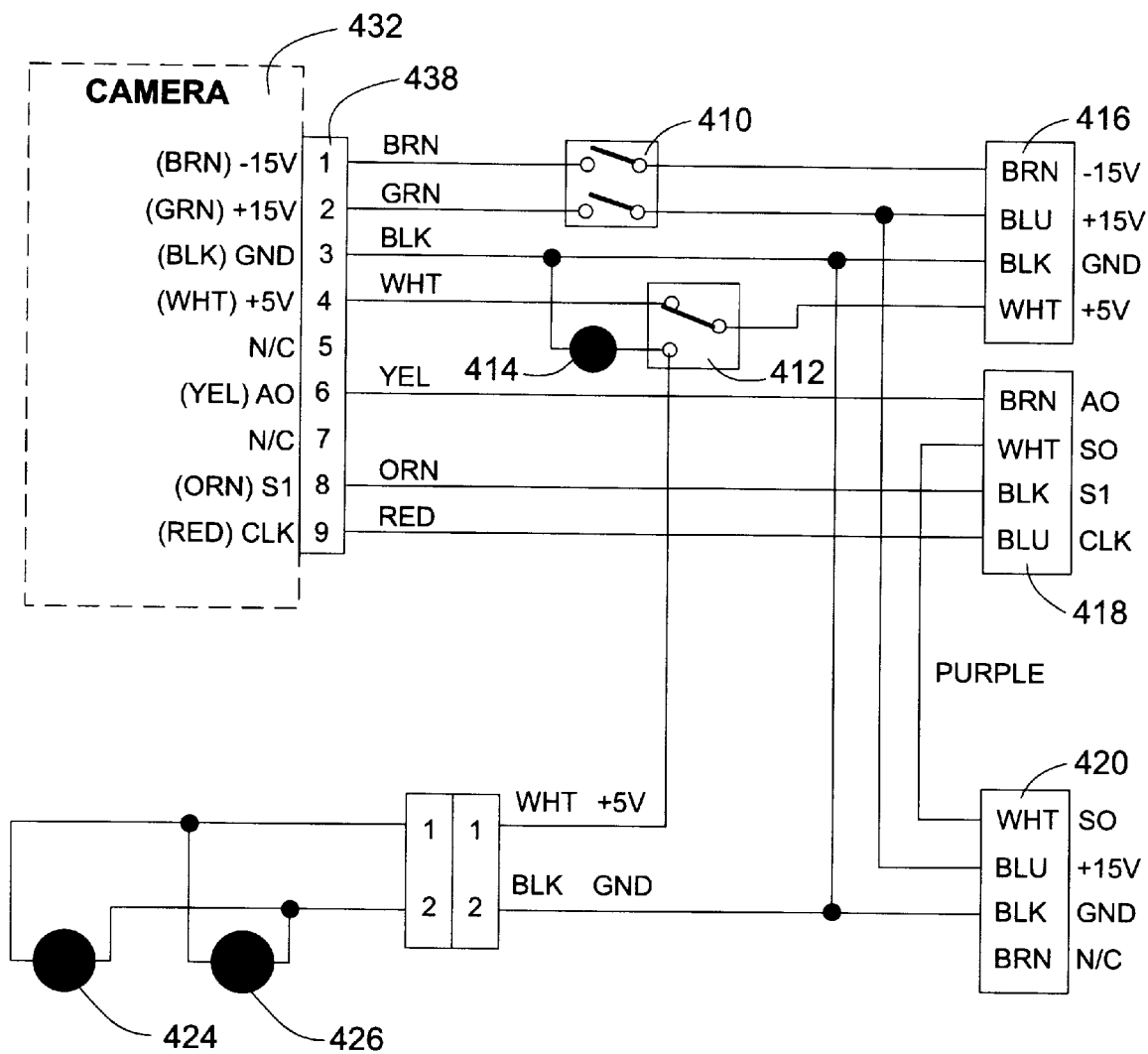
FIG. 13 is a circuit diagram of the electronics of the optical assembly shown in FIGS. 10–12.
Figure 14:
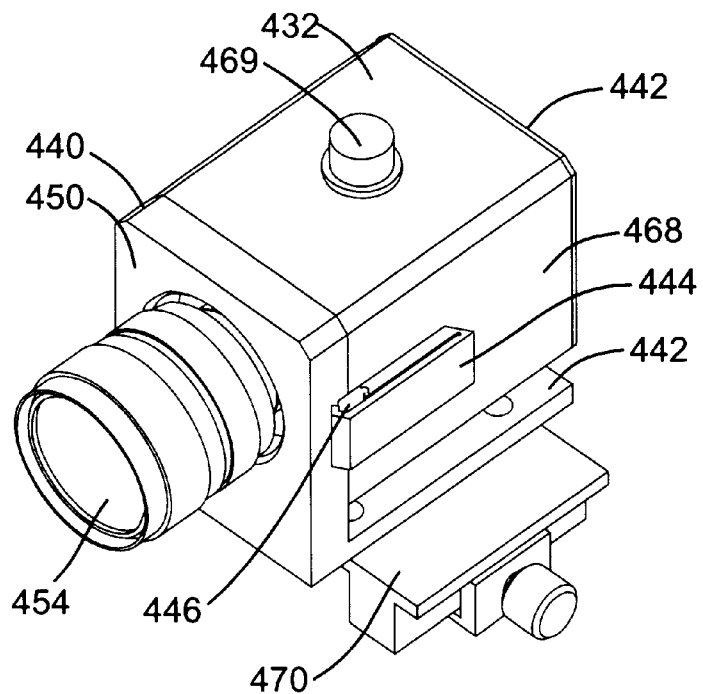
FIG. 14 shows a diagrammatic three-quarter view of the camera of the optical assembly shown in FIGS. 10–12 from above, in front and to one side.

FIG. 12 illustrates the wiring harness of the optical assembly 40, this harness being omitted from FIG. 11 to allow full details of the mirror and camera assemblies to be seen. As shown in FIG. 12, a main internal system harness 434 connects the lasers 424 and 426 to the switches and connectors 410–420, while a camera cable 436 connects a 9-pin subminiature D connector 438 on the bottom face of the camera assembly 432 to the system harness 434. The whole apparatus 10 is powered on and off via the power switch 410, while the lasers 424 and 426 are powered by the laser power switch 412. When the laser power is activated, power to the camera assembly 432 is turned off. The optical assembly 40 is also the location of the system interconnect wiring. All power and signal wiring, internal and external, is connected through this assembly 40. The system harness 434 connects the camera assembly 432 and the locating laser signal and power to the computer system 80 (FIG. 1), as well as routing the detect signal from the bottle detect assembly 70. FIG. 13 illustrates the wiring of the system harness 434 and camera cable 436 shown in FIG. 12.

The camera assembly 432 will now be described in detail with reference to FIGS. 14–17. The camera assembly itself is composed of two primary subassemblies, namely a camera optics assembly, generally designated 440, which combines the optical components and the CCD printed circuit board (PCB) and is shown in exploded view in FIG. 16, and a rear cover assembly 442, shown in FIG. 17. These two subassemblies 440 and 442 are held together by the engagement of manually-operable latches 444 on the rear cover assembly 446 (best seen in FIG. 16) on the optics assembly 440, thus providing a simple housing designed to allow quick replacement of the CCD PCB.

Figure 15:
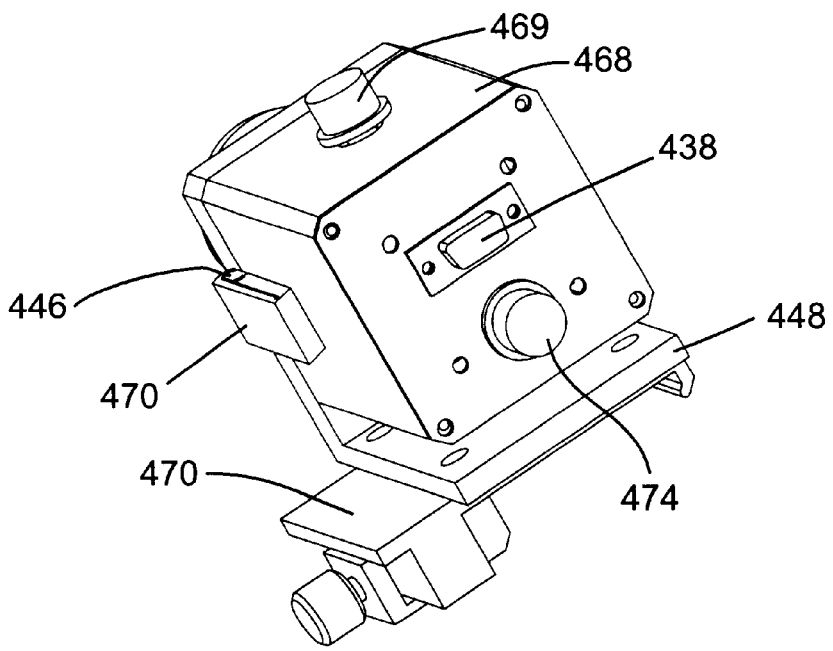
FIG. 15 shows a three-quarter view of the same camera as in FIG. 14 from above, behind and to one side.
Figure 16:
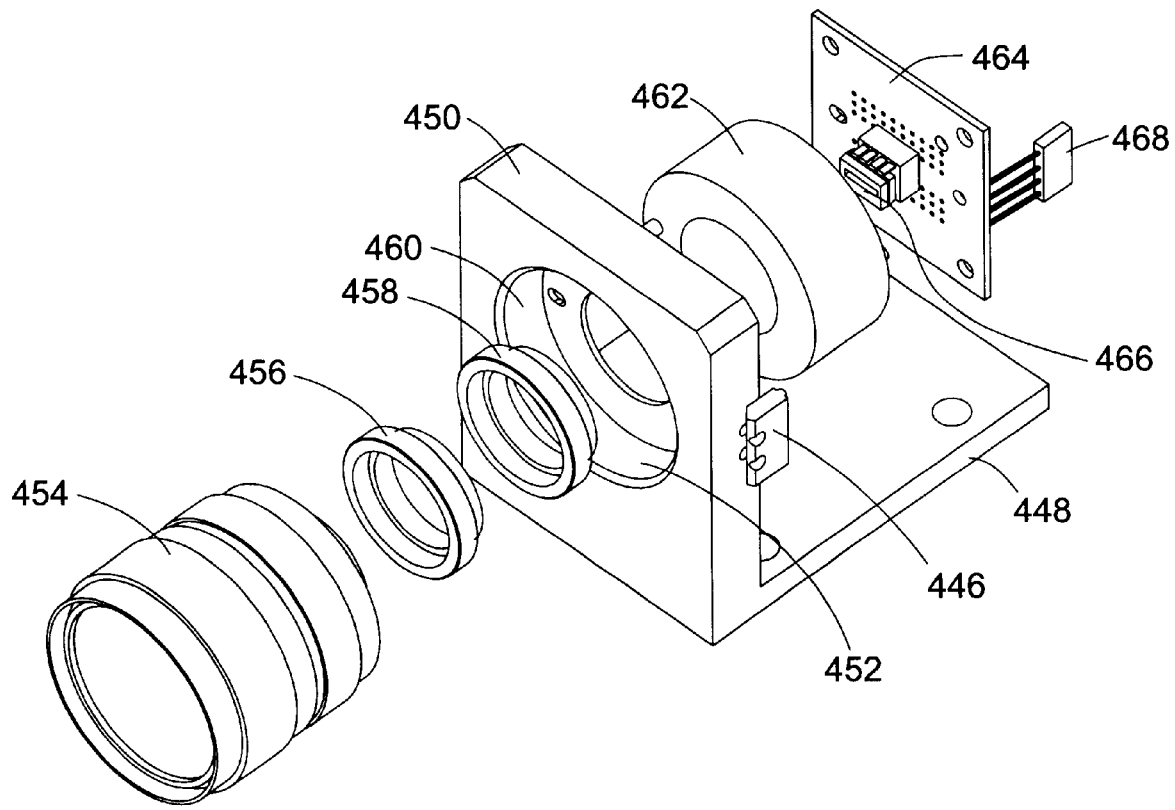
FIG. 16 shows an exploded diagrammatic isometric view of the optical system of the camera shown in FIGS. 14 and 15 from the same angle as in FIG. 10.

As best seen in FIG. 16, the optics assembly comprises a mounting base 448 having at one end an integral upstanding flange 450 provided with a central aperture 452 in which the optical components are mounted. These optical components include a 50 mm fixed focal length adjustable focus objective lens 454. (Although various types of lens can be used in the optical assembly, this lens is preferably zooming and may beneficially be of telecentric design. A telecentric optical system is preferable to avoid height of fill variations because a telecentric system, while becoming less sharp, will not change in image height with changes in the distance from the objective to the bottle.) The objective lens 454 is arranged to form an image of at least a predetermined vertical segment of the bottle containing the area of the bottle where the nominal gas/fluid interface is expected to reside for a given bottle configuration and fill level. The image may encompass the cap as well where the cap is to be a reference. The optical components of the optical subassembly 440 also include a 5 mm spacer 456, a C-mount nut 458, and a special mechanical mounting bracket 460 and C-mount barrel spacer 462, which together serve to correctly position and orient the CCD PCB 464 in the camera assembly 432. The PCB 464 carries a single 128 pixel CCD 466 and an amplifier interface connector 468. All the camera assembly electronics were assembled using off-the-shelf parts and breadboarded printed circuit boards. The base plate 448 is itself mounted on a Melles Griot optical rail guide 470 (see FIGS. 14 and 15), by means of which the whole camera assembly 432 is mounted on the optical rail 422 (see FIGS. 11 and 12).

The CCD 466 is a TSL401 CCD made by Texas Instruments and having the following specifications:

A. 128×1 Pixel CCD. The pixels are 63.5 micrometers (H) X 55 micrometers with 63.5 micrometers center-to-center
B. 400 pixels-per-inch (16 pixel mm$^{-1}$ sensor pitch
C. 256 Gray-Scale (8-bit) Applications
D. Operation to 2 MHz
E. Single 5-V Supply
F. Spectral sensitivity from 300–1000 nanometers.
G. System Package 8 pin Dip
H. Signal Output: 0–2V.

Figure 17:
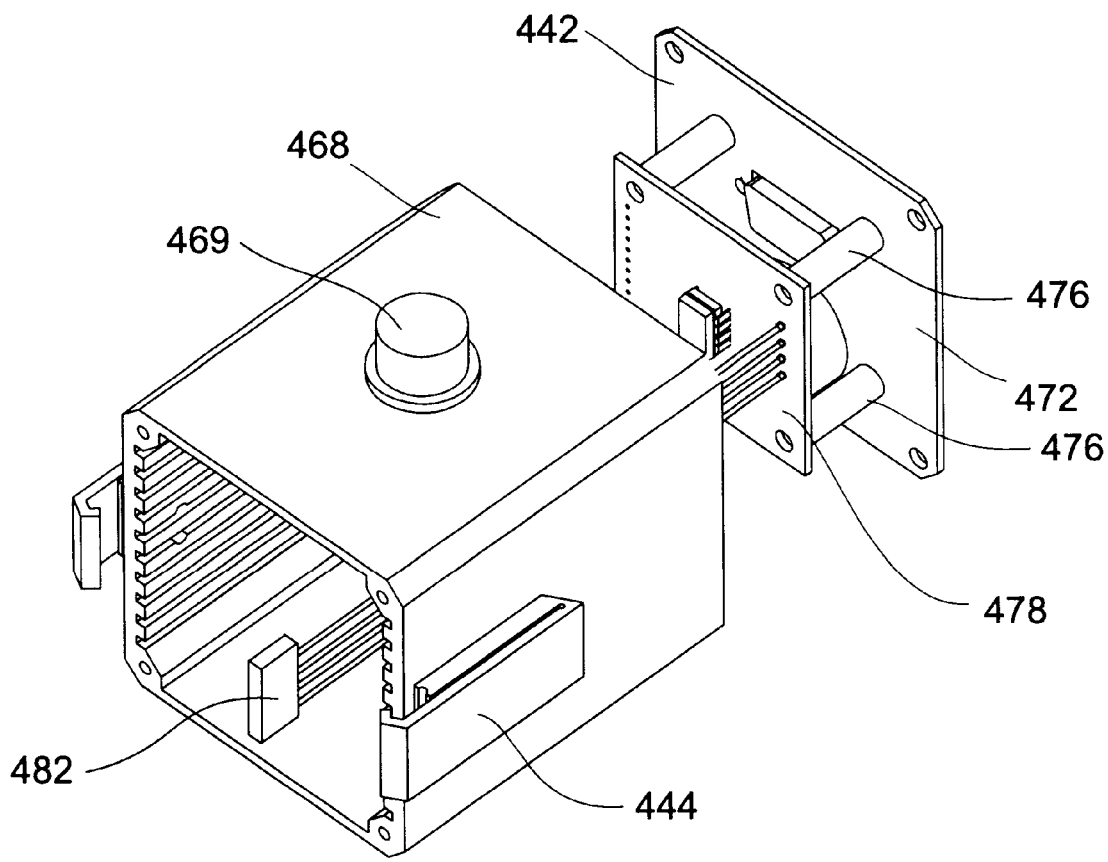
FIG. 17 shows an exploded diagrammatic isometric view, from the same angle as in FIG. 16, of the housing, rear cover and electrical connectors of the camera shown in FIGS. 14–16.

As shown in FIG. 17, the rear cover assembly 442 comprises a hollow square prismatic camera body 468, which carries the latches 444 and a manually-operable gain adjust knob 469, and a rear cover 472, which carries the connector 438 and a manually-operable offset gain adjust knob 474 (see FIG. 15). The camera body 468 is a stock aluminum extrusion, but the rear cover 474 is modified for use in the present apparatus. The front surface (i.e., the surface facing the lens 454) of the rear cover 472 is provided with four pillars 476, which support an amplifier PCB 478 carrying an inverting amplifier 480, which is an A741 general purpose operational amplifier manufactured by Texas Instruments. An interface connector 482, which mates with the connector 468 (FIG. 16) of the CCD PCB is also connected to the amplifier PCB 478.

Figure 18:
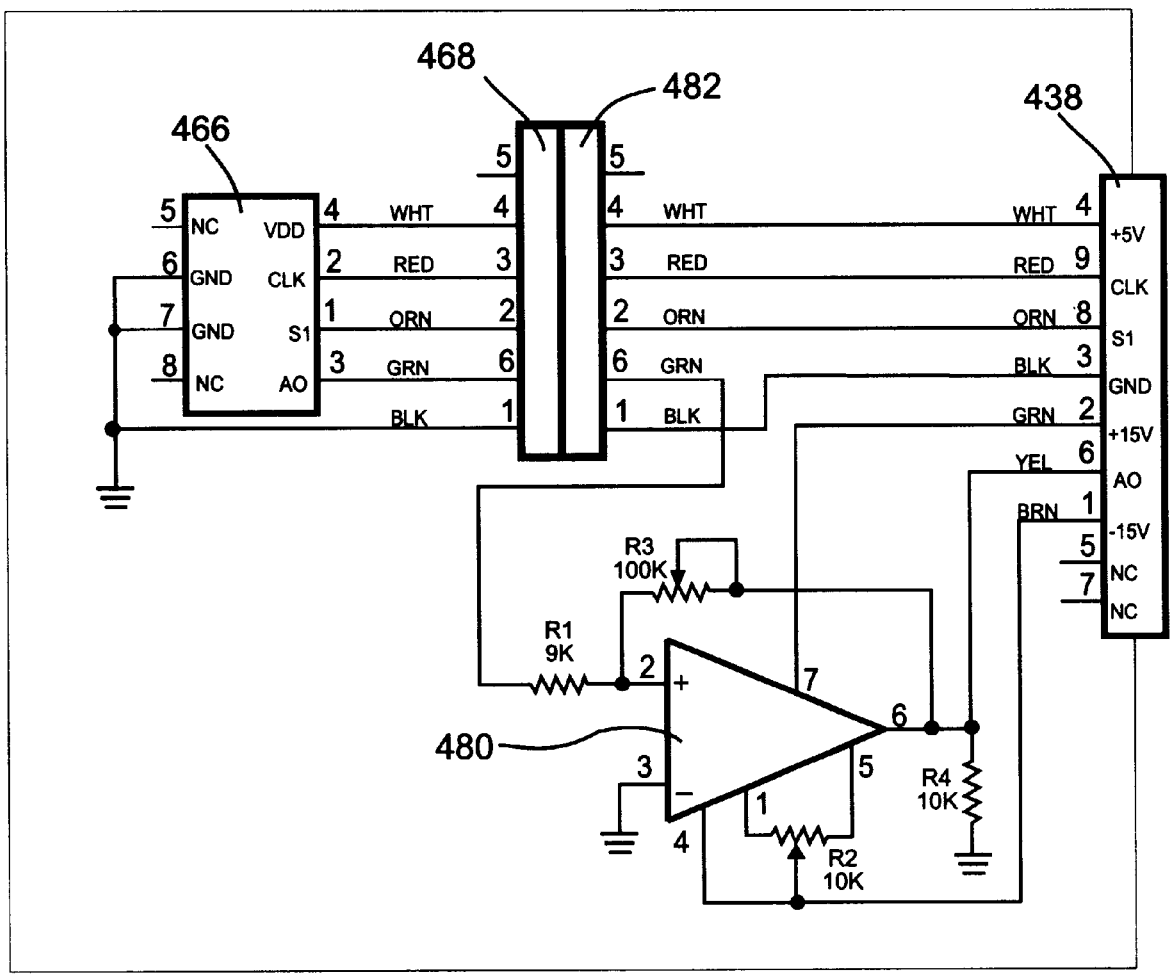
FIG. 18 is a circuit diagram of the electronics of the camera shown in FIGS. 14–17.

FIG. 18 shows the wiring diagram of the camera assembly 432, and the signal/power information required to operate this camera assembly. Some of the information contained has been copied from the original manufacturer's specification. The camera assembly 432 meets the following specifications:

A. Inverting Amplifier internal to camera to buffer the signal output to match its 0–2V dynamic range to 0 to −10V A/D converter.
B. C-mount style optical mount for Taking lens.
C. Power Requirements
  C1. +5V to CCD photodiode array
  C2. +15V and −15V for inverting amplifier circuit
  C3. Common Ground
D. Signal Input and Output
  D1 Clock
  D2 S1
  D3 Analog Out
E. Clock Speed: Approx. 32 kHz (Max. speed 2 MHz– potential speed>60X)

Figure 19:
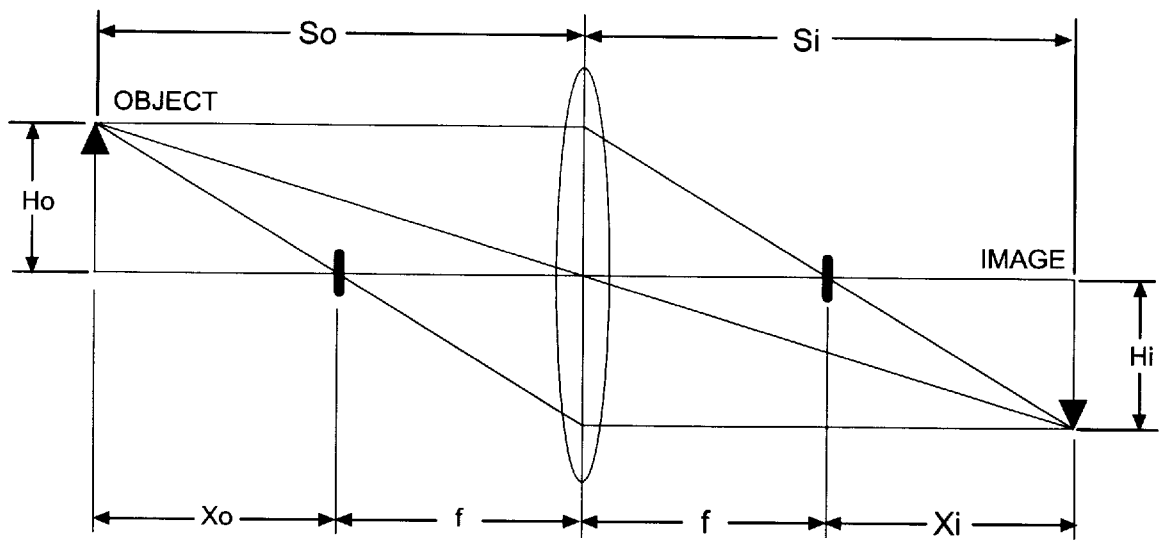
FIG. 19 shows diagrammatically the optical system of the optical assembly shown in FIGS. 1 and 10–12 and the relationship between the height of the upper portion of the bottle, the magnification of the optical system and the height of the detector.
Figure 19:
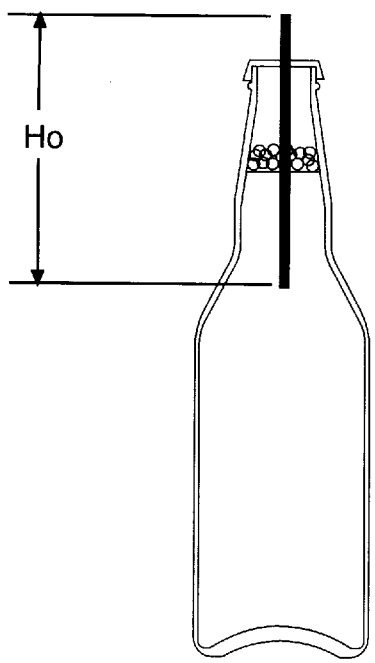

In the camera assembly 432, the lens 454 is adjusted so that the image of the bottle formed on the CCD 466 (FIG. 16) has a magnification of 0.12–0.13. The reasons for choosing this magnification will now be explained with reference to FIG. 19.

In determining the object distance from the lens, close consideration of the location of the system window (the window in the door 404, see FIG. 10, through which light enters the optical assembly 40 after passing through a bottle) was made. Because of splash, contamination, and container destruction causing foam and other debris to form on the window, the distance between the unit under test and the window and the distance from the window to the lens was maximized. It will be recalled that the apparatus 10 is designed to measure HOF to ±1 mm, which in practice means that ±2 pixels must equal ±1 mm. The object height $H_o$ in FIG. 19, which corresponds to the vertical height of the section of bottle to be scanned was set to 2.5 inch (63.5 mm) to cover the expected 1.55 inch (39 mm) between the fill level 160 and the upper end of the cap 156 (see FIG. 4), together with a modest distance above the cap, and allowances for expected variations in the height of the fill level 160 and overall vertical movement of the bottles relative to the apparatus 10. Since the CCD comprises a linear 128 pixel array with a center-to-center spacing of 63.5 μm between adjacent pixels, the total scan line, and thus the maximum image height, $H_i$, is 0.320 inch (8.13 mm). Thus, the magnification M for optimum image resolution is given by:

$$M = H_i/H_o = 8.13/63.5 = 0.13$$

Also, since the focal length, f, of the lens 454 (see FIG. 14) was determined to be 50.7 mm, the distance $X_0$ is given by:

$$X_0 = f/M = 50.7/0.13 = 390 \text{ mm (15.35 inch)}$$

and the distance $X_i$ is given by:

$$X_0 = fM = 50.7 \times 0.13 = 6.5 \text{ mm } (0.26 \text{ inch}).$$

Finally, the object distance, $S_0$, and the image distance, $S_i$, are given by:

$$S_0 = X_0 + f = 440.7 \text{ mm } (17.37 \text{ inch})$$

$$S_i = X_i + f = 57.2 \text{ mm } (2.25 \text{ inch})$$

Figure 20:
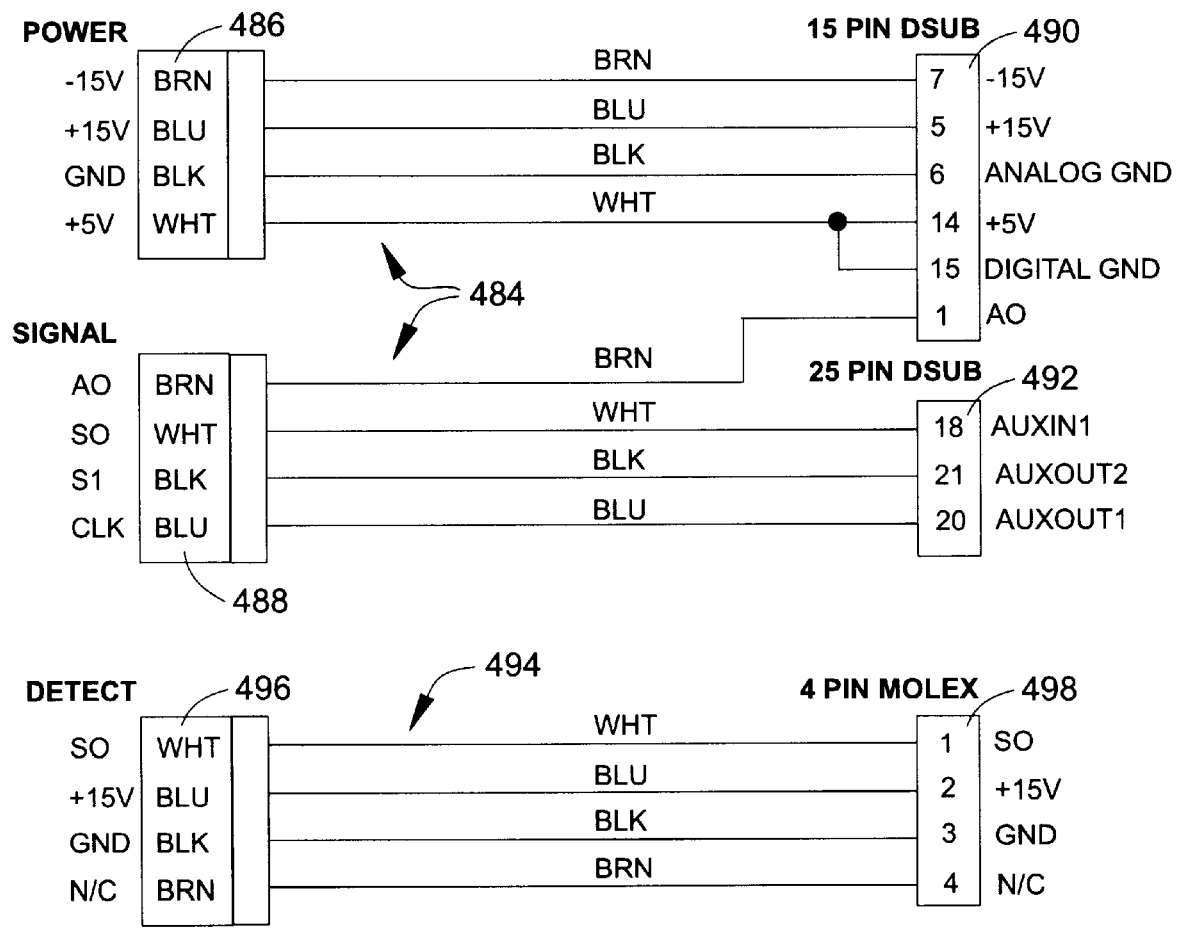
FIG. 20 shows a wiring diagram of the cables used to interconnect the optical assembly and computer system shown in FIG. 1.

The HOF apparatus 10 interfaces with the computer 80 via an interface cable 484 that connects the apparatus to a motor control/analog-digital converter in the computer to drive the system. As shown in FIG. 20, connection between the optical assembly 40 and the computer system 80 is made by this NEMA rated cable 484, that has two Turck connectors 486 and 488 at its optical assembly end, these connectors mating with the power and signal connectors 416 and 418 respectively (see FIG. 13) on the door 404 (see FIG. 10). The computer end of cable 484 is provided with two subminiature D connectors 490 and 492 (having 15 and 25 pins respectively) which are connected to a motor control/analog-digital converter printed circuit board in the computer 80. A second cable 494, which also interconnects the optical assembly 40 and the computer 80 has a Turck connector 496 mated with the detect connector 420 (see FIG. 13) on the door 404 (see FIG. 10) and, at its opposed end, a 4 pin Molex connector 498 mated with a corresponding connector on the computer 80.

If desired, the apparatus 10 may be easily interconnected to a network using the standard 4-pin Turck NEMA rated panel connectors and standard double-ended 4-pin NEMA rated interface cables. Because of system speed constraints, portage to a network system will make better use of the detection software and hardware.

Figure 21:
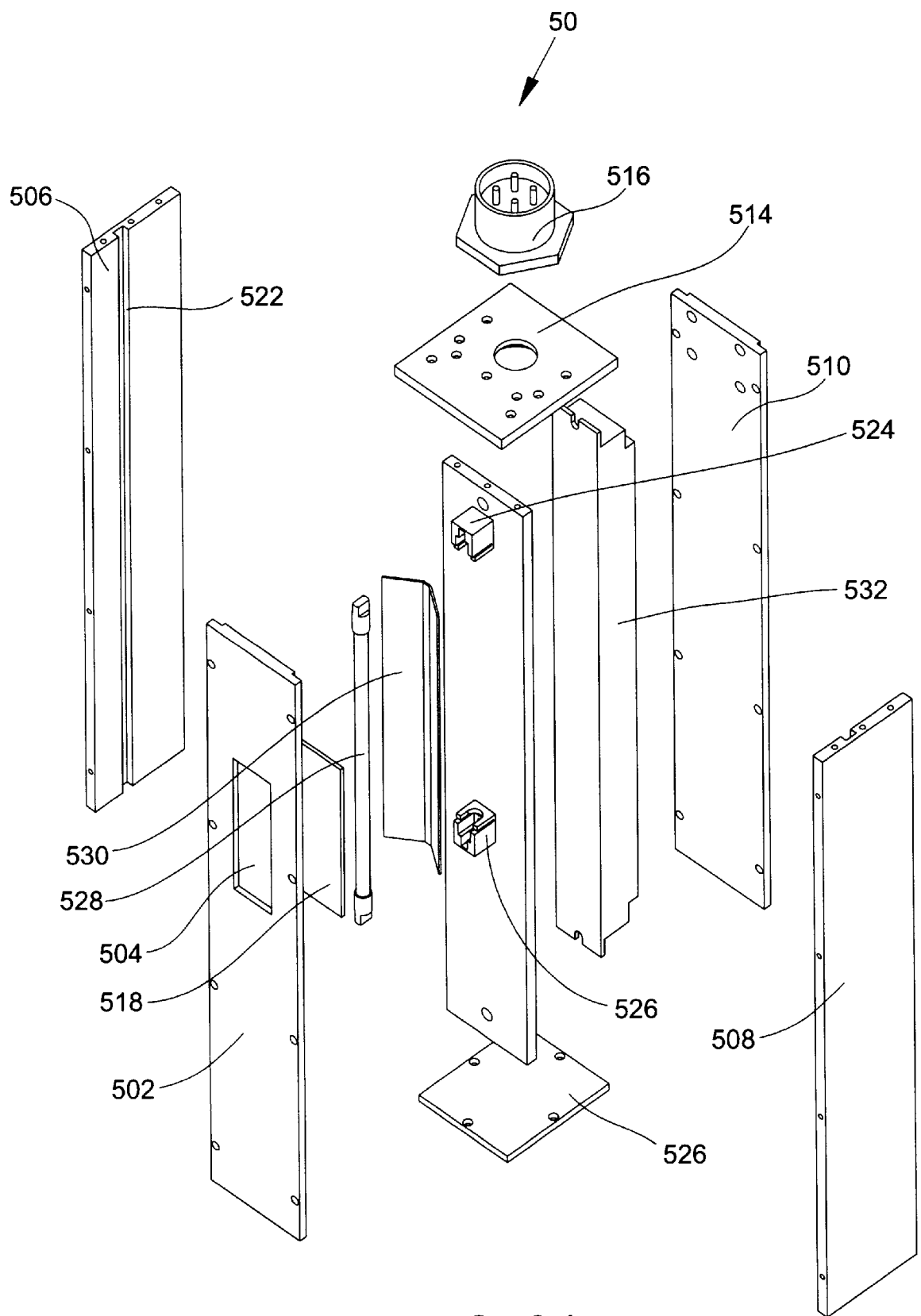
FIG. 21 shows an exploded isometric view of the light source assembly shown in FIGS. 1 and 2 from above, in front and to one side.

As shown in FIG. 21, the light source assembly 50 has a cuboidal housing comprising a front panel 502 having an elongate vertical slot 504 cut therein, side panels 506 and 508, a rear panel 510, a bottom panel 512 and a top panel 514, on which is carried a power connector 516. This housing provides a rigid structure to support a fluorescent tube (described below). A lenticular lens 518 is held within the slot 504 in the front panel 502. A vertical electrical mounting panel 520 is held by vertical grooves 522 in the side panels 506 and 508 (only one of the grooves 522 is visible in FIG. 21) parallel to but spaced from the front panel 502 and the rear panel 510. The mounting panel 520 carries two lamp sockets 524 and 526, in which is held a micro fluorescent tube 528. A mirrored reflector 530 is held between the lamp sockets 524 and 526 to reflect light from the tube 528 toward the slot 504 to better utilize the light in the horizontal direction, while a high speed ballast 532 for the tube 528 is mounted on the opposed side of the mounting panel 520 from this tube. The lenticular lens 518 and reflector 530 help to uniformly spread the light over the entire slot 504. Power to the light source assembly 50, supplied via the connector 516, is wired separately from the power to the optical assembly 40.

Light from the tube 528 passing through the lenticular lens 518 backlights the bottles passing along the line 20 (see FIG. 1) and the light passes through the upper portions of these bottles to form the previously described images within the optical assembly 40.

A preferred tube that has been found useful for use in the light source assembly 50 is as follows:

1. Osram Sylvania (2020G)FM6/H/830 Mini-Fluorescent Lamp
2. T2 Lamp diameter
3. 6 watts, 47 volts
4. Initial Lumens: 310
5. Avg. Rated Life: 10,000 Hours
6. Peak Spectral Frequency: 570–630 nm A preferred ballast which has been found useful is as follows:

1. Energy Saver Ballast ES-1-T2-120-F
2. Rated Specifically for T2 Lamps
3. Lamp Wattage: 11 watts
4. Input Voltage: 120 volts
5. Frequency: Approx. 40 khz
6. Flicker<3%

Figure 22:
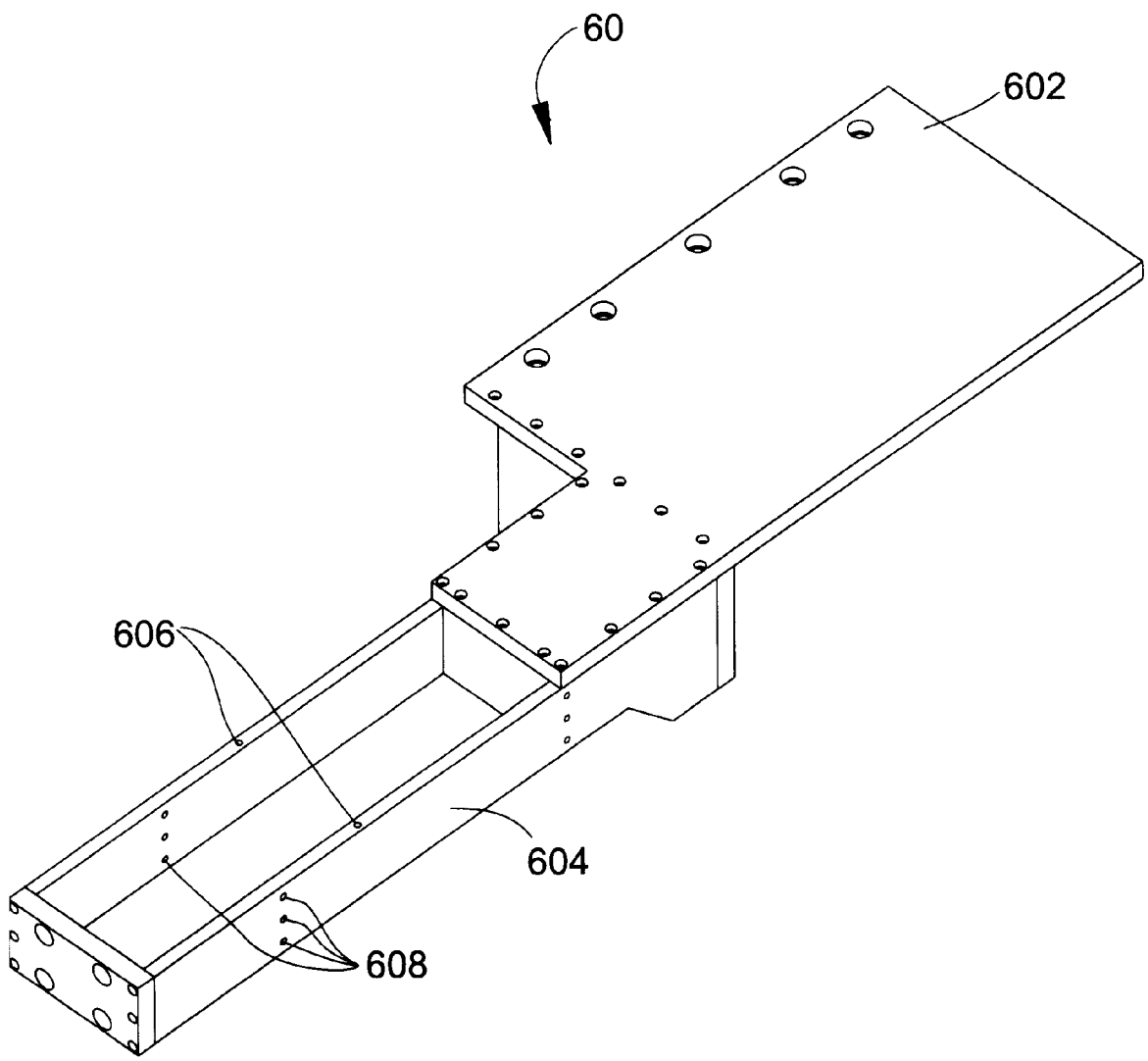
FIG. 22 shows an enlarged three-quarter view of the bridge assembly shown in FIGS. 1 and 2 from above and to one side.

The bridge assembly 60 shown in FIG. 22 is an assembled aluminum structure used to locate and mount the bottle detect assembly 70 and the light source assembly 50. The bridge assembly 60 comprises a flat plate 602 that is secured to the base plate 402 (see FIGS. 2 and 13) of the optical assembly 40 and a rectangular frame 604 provided with a first set of bores 606 for mounting the bottle detect assembly 70 and a second set of bores 608 for mounting the light source assembly 50. The bridge assembly 60 is preferably designed so that its dynamic properties serve to isolate the assemblies mounted thereon from ambient vibrations that may be of concern.

Figure 23:
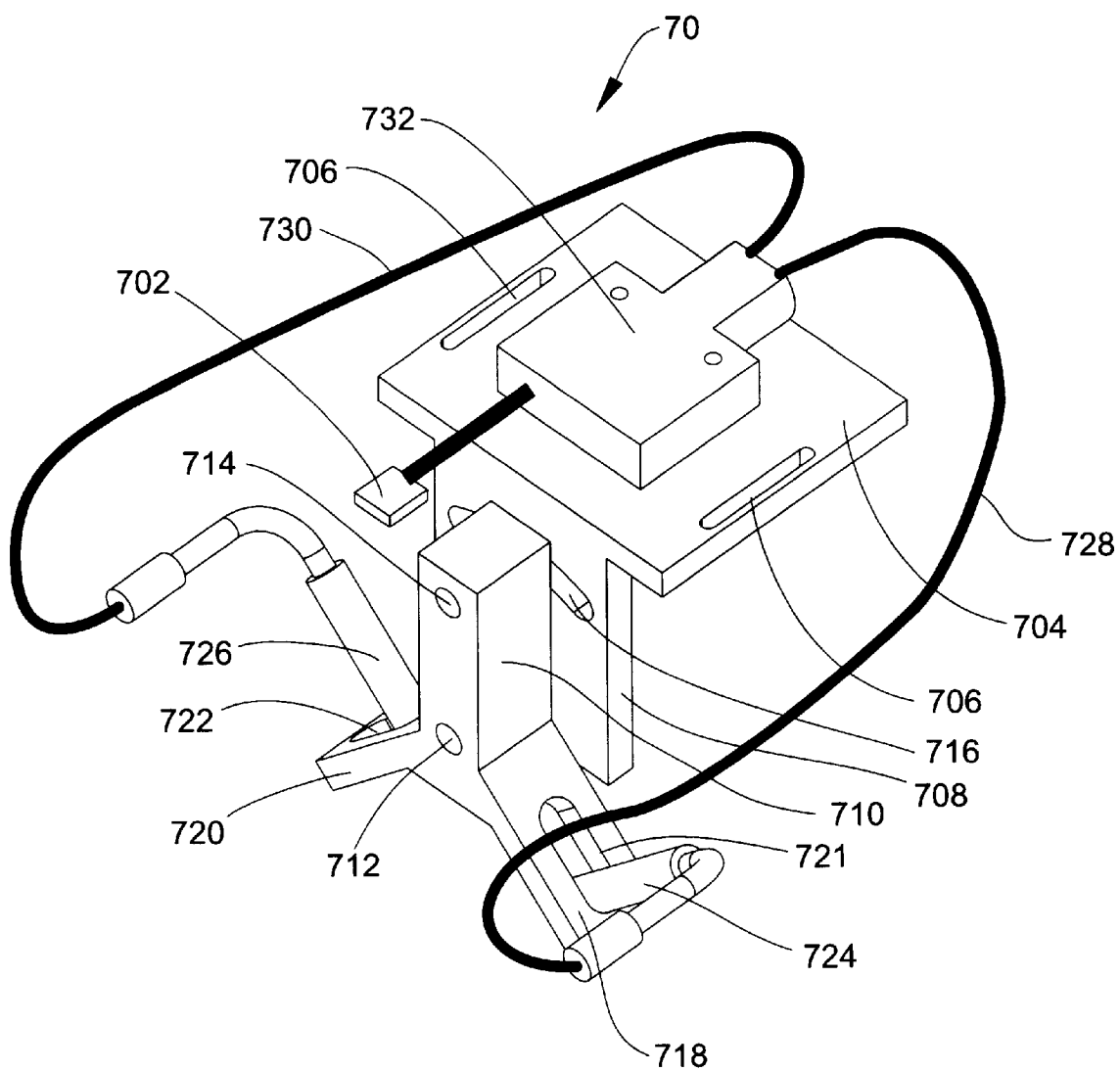
FIG. 23 shows an enlarged diagrammatic three-quarter view of the bottle detect assembly shown in FIGS. 1 and 2 from above and to one side.

As shown in FIG. 23, the bottle detect assembly 70 comprises a mounting plate 704 having two slots 706 provided along its lateral edges. Although not shown in FIG. 23, bolts are secured through these slots 706 and into the bores 606 (see FIG. 22) in the bridge assembly 60 to secure the bottle detect assembly 70 fixedly in position on the bridge assembly 60. The front edge of the mounting plate 704 carries a downwardly extending flange 708. An emitter/detector mount 710, having substantially the form of an inverted "Y", is pivotally mounted on the flange 708 by means of a pin 712 which is journaled into a bore (not visible in FIG. 23) in the flange 708. A second pin 714 on the mount 710 is engaged in an arcuate slot 716 cut in the flange 708, and serves to limit the pivoting of the mount 710 relative to the flange 708.

The lower limbs 718 and 720 of the mount 710 each extend downwardly at an angle of about 45° to the vertical and are each provided with an elongate slot 721 and 722 respectively extending completely through the limb. An emitter 724, which may have the form of a light emitting diode, is mounted in the slot 721 so that the beam from the emitter extends downwardly at an angle of about 45° to the vertical. A detector 726 is similarly mounted within the slot 722. Cables 728 and 730 extend from the emitter 724 and the detector 726 respectively to a mounting block 732 fixedly mounted on the mount 704, and are there connected to the connector 702, which is used to distribute power and transfer signals via a complementary connector not shown but linked with the central computer. When a bottle passes beneath the assembly 70, the beam from the emitter 724 strikes the cap 156 (see FIG. 4) of the bottle, and the reflected beam from the cap is detected by the detector 726, which sends a signal via the cable 730 and a connector 702 to cause the optical assembly 40 to begin the scanning process. If desired, a second bottle detector, for example a mechanical switch, may be provided in the apparatus 10; detection of a bottle by such a mechanical switch, coupled with failure of the bottle detect assembly to detect the same bottle, indicates a bottle lacking a cap, which should be rejected by the bottle reject assembly 100 (see FIG. 1). This is apparent because the mechanical system will indicate that a bottle is present while the lack of a cap will cause no return signal from the absent but anticipated cap.

Figure 24:
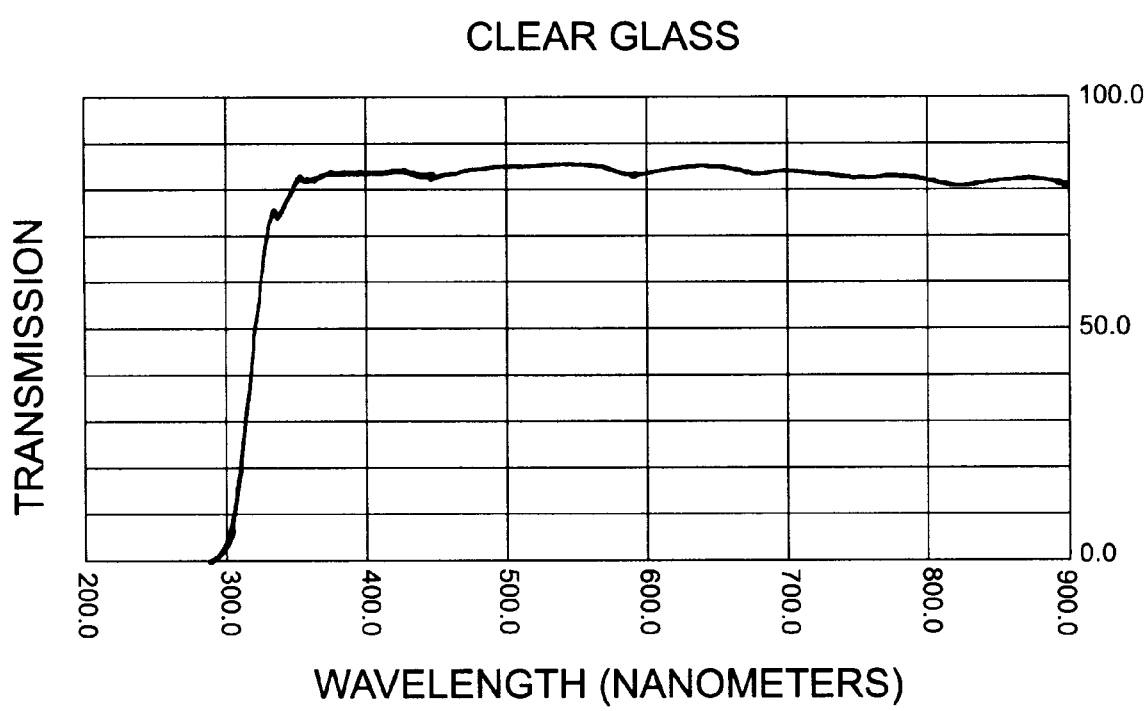
FIGS. 24, 25, and 26 are transmission curves of clear, brown and green glass samples respectively over the wavelength range of 200–900 nm.
Figure 26:
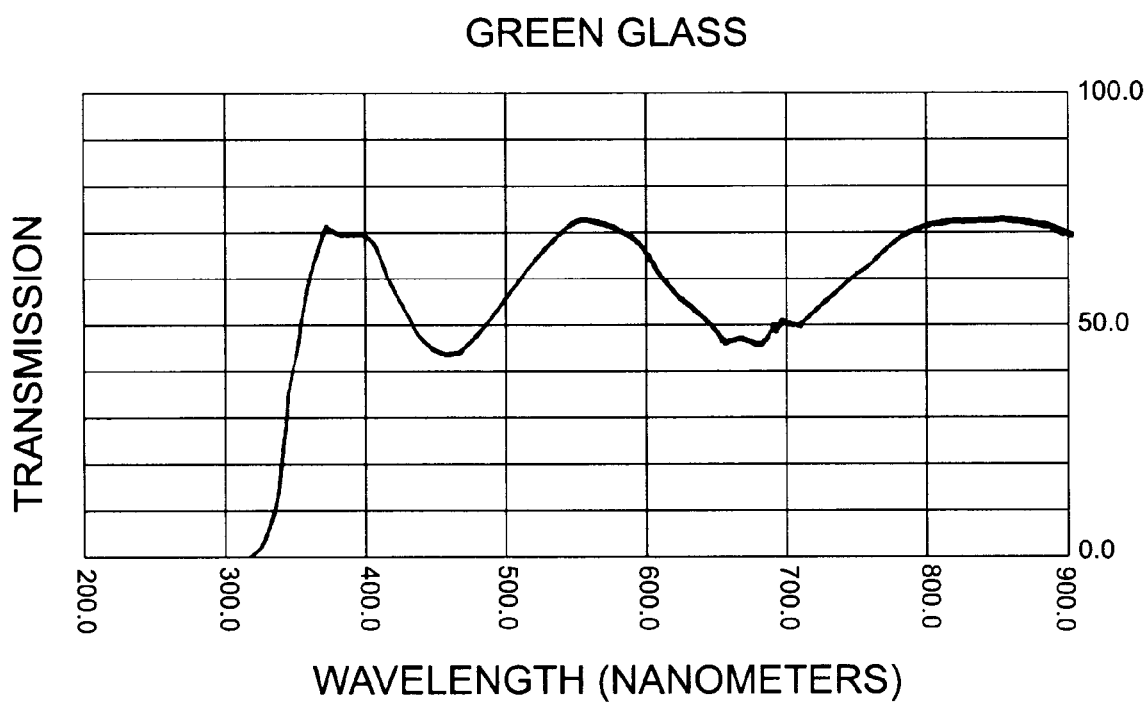

FIGS. 24, 25 and 26 show transmission curves for typical clear, brown and green glasses respectively. From these transmission curves, it will be seen that the brown glass is essentially opaque to wavelengths below about 500 nm, while the transmission of the green glass varies in a rather irregular manner below about 700 nm. However, all three glasses have fairly flat curves above 700 nm, in the near infra-red region. Accordingly, to permit the present apparatus to be used with all three types of glass, it is advantageous to use a radiation source which has substantial emission in this region. The preferred fluorescent tube described above emits a spectrum which has similar transmission through brown, green and clear glass beverage containers.

There will now be described a simple algorithm, applicable when back lighting is used, for determining cap height and fluid height in the "Height of Fill" (HOF) system. The following methodology also allows for correction of the measured HOF for foam in bottles that contain a foamy fluid. Foam correction can be used on any bottled fluid that has foam in the space between the top of the fluid and the cap or lid of the bottle.

A bottle is considered to be back lit when the bottle is located between the source (such as the assembly 50) and the detector (such as the linear CCD array 466, see FIG. 16). The light emitted from the source either passes through features of the bottle or is blocked by the bottle. The light that passes through the bottle is focused on the detector.

To calibrate the apparatus for foam measurement, place a bottle (unshaken so as to contain no foam) in the apparatus. Adjust the overall gain of the detector until the detector is saturated everywhere except in the regions blocked by the cap and by the meniscus of the fluid, i.e., so that the curve of output versus pixel number is similar to that shown in FIGS. 6 and 7 except that, since no foam is present, the region BC is of much smaller width, being confined solely to the meniscus of the fluid. Store the saturated level in memory for later use. Note that such saturation is not absolutely required.

Once the system has been calibrated in this way, the following very simple algorithm can be used to determine the position of the top of the cap and the fluid height. First the cap and fluid pixels (i.e., the pixels on the detector corresponding to the top of the cap and the top of the fluid) are found by transferring the CCD array data to memory. Starting with pixel-1, search in an upward direction (pixel-1, pixel-2, etc. . . ) for the first pixel that is at 95% to 99% percent of the saturated level. That is the cap pixel corresponding to the top of the cap. Then, starting with the last pixel search in a downward direction (pixel-N, pixel-(N-1), etc. . . ) for the last pixel that is at 95% to 99% of the saturated level. That is the fluid pixel corresponding to the top of the fluid.

The above algorithm works very well for finding the data (cap and fluid pixel location) necessary to determine the height of fill in a bottle. This algorithm does not, however, take into account the additional volume of fluid in the bottle that is in the form of foam. Better measurements of the height of fill take into account this additional volume of fluid, and therefore correct the fill level, to allow for liquid present in the foam.

The foam calibration/correction may be determined as follows. Light passing through the neck of a bottle will be scattered and blocked by foam. The transmission at any given position in the neck will be altered due to the presence and density of the foam at that position. The total decrease in transmission integrated over the entire bottle neck can be used to determine the volume of fluid contained in the foam. Determining a foam correction curve for each bottle/fluid combination eliminates the need to factor out the volume effect due to bottle geometry.

Figure 27:
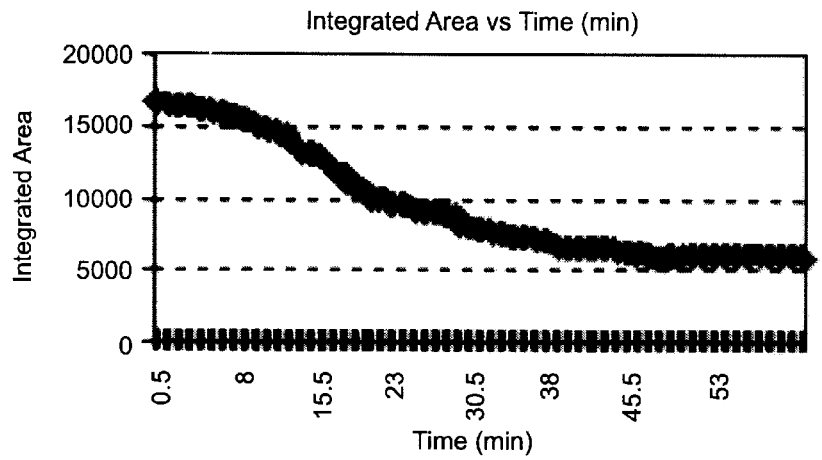
FIG. 27 is a graph of the variation of the integrated area under a transmission curve such as those shown in FIGS. 6–9 with time during a procedure (described below) for determining a correction of a HOF measured by the apparatus shown in FIG. 1 to allow for the liquid present as foam within a bottle being measured.
Figure 28:
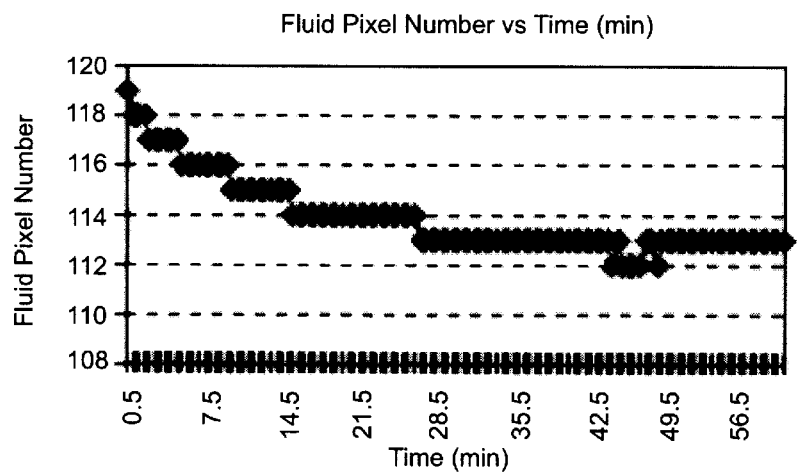
FIG. 28 is a graph of the variation of the pixel number corresponding to the measured HOF with time during the same procedure as in FIG. 27.

To determine the necessary foam correction, vigorously shake a bottle. Place it in the HOF apparatus, and every (say) 30 seconds scan the bottle, find the cap pixel, fluid pixel, and integrated area under the detector data curve. Perform scans until the foam has completely decayed away, typically at the end of roughly one hour. Thereafter, plot cap pixel, fluid pixel and integrated area as a function of time from the point of maximum foam to no-foam. FIG. 27 shows a typical graph of integrated area against time, while FIG. 28 shows a typical graph of fluid pixel number against time. Notice that the cap pixel should not vary with time, the integrated area decreases as the foam decays, and the fluid height will increase as the foam decays (and accordingly, the fluid pixel number, which is measured downwardly from the top of the scanned region will decrease).

Figure 29:
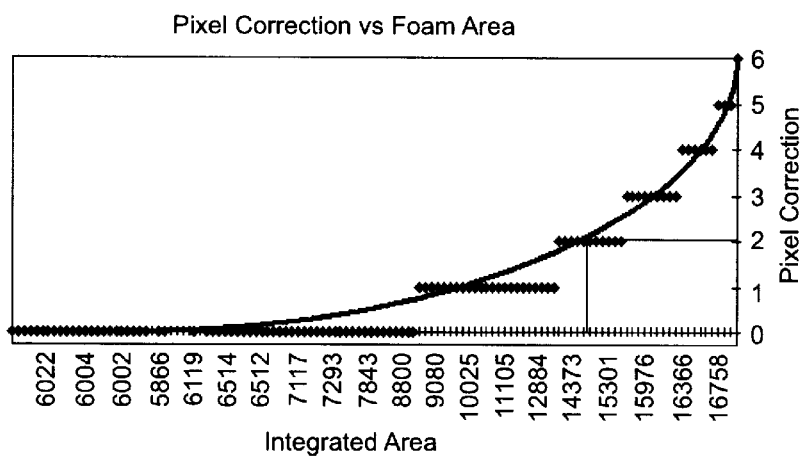
FIG. 29 is a graph, derived from the graphs shown in FIGS. 27 and 28, showing the correction which should be applied to the HOF measured by the apparatus shown in FIG. 1 to allow for the liquid present as foam within a bottle being measured.

A functional relationship for pixel correction factor versus decreased transmission due to the presence of foam can now be determined. Subtract the base line (no-foam) fluid-height pixel value (determined from the right-hand side of FIG. 28) from the fluid-height pixel values obtained in the timed data series, then plot this change in fluid-height pixel value versus the area under the transmission curve. The resultant graph is shown in FIG. 29. The area under the transmission curve can be further corrected for the area that appears under the curve that is due solely to the cap, glinting of the neck, and the meniscus. This area correction is not necessary for the foam correction to work.

A function or look-up table can then be generated for this data. This table or function will then be the foam calibration record for the given bottle with the given fluid.

Example: The integrated area of a scanned bottle was found to be 14373 units. From FIG. 29, we see that we will need to subtract 2 pixels from the value of the fluid pixel value. Pixels are subtracted since we are counting pixels from the top down; a higher fluid level corresponds to a lower pixel value.

The magnification of the optics of the system can then be used to transform the cap pixel and corrected fluid pixel into real values of the height of fill. The step nature of the fluid pixel level is due to limits in magnification and resolution of the system. Thus, an improved foam calibration curve can be generated using a CCD array with 256 pixels instead of the 128 pixels described above.

This simple "area under the curve" method of foam calibration ignores any analytical consideration of foam quality, but is believed to inherently take it into account. A foam correction performed in this manner ignores the fact that a bottle with very dense foam in half of the neck and a bottle with slightly less dense foam in all of the neck may have the same integrated area under the transmission curve.

It will be apparent to those skilled in the art that numerous variations on the above techniques for determining HOF and correcting the determined value for liquid present as foam may be employed in the present invention. For example, if the transmission/pixel number curve resembles that in FIG. 9 with only the area above the cap saturated, the location E can be found by scanning upwardly from the first pixel, first locating the region FE, which contains several pixels exhibiting saturation, and then determining the first pixel which shows less than (say) 90% of the saturation value. To find the location B, corresponding to the top of the liquid and the beginning of the foam, one could scan downwardly from the highest-numbered pixel and determine the first pixel showing an output less than a threshold T, which may be arbitrarily set at (say) 50% of the saturation level. However, in view of the complexity of the curve shown in FIG. 9, and the possibility that, for example, the bottom of the depression denoted "U" in that Figure might, in some bottles, extend below the threshold T, it is desirable that the software check that several pixels, having numbers immediately below the probable location B determined in this manner, all have values lower than T, i.e., the software should check that there is a substantial dark region BC, corresponding to a significant thickness of foam, present immediately above (to the left in FIG. 9) of the probable location B. This of course assumes that one can rely on such a thickness of foam being present; in practice, when the present processes are used on a filling line using a foamable liquid, this assumption is normally entirely safe.

Note that, even if the location B determined in this manner is displaced by a few pixels from the "true" location B (because the curve does not pass the threshold T for a few pixels after its begins its downward slope corresponding to the transition from liquid to foam), this displacement is of little practical consequence, provided that the apparatus is calibrated using a bottle comparable to those which will be measured, since the same displacement can be expected in all cases. In effect, one is comparing the bottles being tested with the properly-filled bottle used for calibration, rather than seeking to measure an "absolute" HOF.

Similar modifications may be made to the procedure described above for correcting for liquid present in the foam. For example, in an "unsaturated" curve such as that shown in FIG. 9, it is quite likely that the irregular curve in the region AB will vary somewhat from bottle to bottle, which would introduce errors in the determination of the area under the curve. To reduce such errors, it may be desirable to determine the area under the curve only within the region BE. Alternatively, one might determine the foam thickness directly by continuing the downward pixel scan past location B and finding location C directly, for example by measuring the point at which the curve (read from right to left in the downward scan being discussed) rises above the threshold T and remains above this threshold for several pixels. However, if location C is to be determined in this manner, the software should allow for the possibility that the foam layer completely fills the neck of the bottle, so that the signal remains below the threshold T over the entire region BE.

It will be apparent to those skilled in computer programming that all of the techniques described above for determining HOF and correcting for liquid present as foam can be implemented by routine programming techniques which are well within the present level of skill in the programming art.

Other embodiments and variations in the invention will be obvious to those skilled in the art having the benefit of the foregoing disclosure.

What is claimed is:

1. A process for determining the height-of-fill of a container comprising a body having an optically detectable feature, and contents filling the body up to a fill level spaced from said optically detectable feature, at least a measuring portion of the container extending from the optically detectable feature to the fill level being capable of transmitting electromagnetic radiation, which process comprises:
    illuminating at least the measuring portion of the container with electromagnetic radiation;
    forming an image of part of said measuring portion of the container; and
    analyzing the image by data processing means to identify:
        (a) a first region having a first intensity that varies in accordance with the properties of the optically detectable feature; and
        (b) a second region having a second intensity that varies in accordance with the optical properties of the contents below the fill level,
    and determining the distance between a point within the first region and the upper edge of the second region, thereby determining the height-of-fill.

2. A process according to claim 1 wherein the radiation is caused to pass through the measuring portion of the container.

3. A process according to claim 2 wherein the radiation is infra-red radiation.

4. A process according to claim 1 wherein the container has an opening at its upper end and a closure member substantially closing the opening, and wherein the optically detectable feature comprises at least part of the closure member.

5. A process according to claim 4 wherein the closure member essentially does not transmit the radiation, and the analysis determines the distance between the upper end of the first region and the upper edge of the second region.

6. A process according to claim 4 wherein the contents comprise a liquid having foam on the surface thereof, and the analysis identifies the first region of low radiation transmission associated with the closure member, the second region of high radiation transmission associated with the liquid, and a third region of low radiation transmission associated with the foam.

7. A process according to claim 6 further comprising determining the vertical height of the third region, converting this vertical height to an equivalent vertical height of liquid, and adjusting the determined height-of-fill to allow for the amount of liquid which would be generated if the foam were converted to liquid.

8. A process according to claim 1 wherein the image is formed by a linear array of radiation detectors.

9. A process according to claim 8 wherein radiation from the measuring portion of the container is passed through an image-forming device so that the image is formed upon the linear array of radiation detectors which are spaced from the container.

10. A process according to claim 9 wherein the image formed by the image-forming device has a magnification less than one.

11. A process according to claim 1 further comprising moving a plurality of the containers in single file past a station at which the containers are illuminated with the electromagnetic radiation and the images of the containers are formed, and detecting the presence of one of the containers at the station prior to forming the image thereof.

12. A process according to claim 11 wherein each of the containers has an opening at its upper end and a closure member substantially closing the opening, and wherein the presence of one of the containers at the station is effected by projecting a first beam of radiation on to the closure member of a container at the station and detecting the second beam produced by reflection of the first beam from the closure member.

13. Apparatus for determining the height-of-fill of a container comprising a body having an optically detectable feature, and contents filling the body up to a fill level spaced from said optically detectable feature, at least a measuring portion of the container extending from the optically detectable feature to the fill level being capable of transmitting electromagnetic radiation, the apparatus comprising:

image-forming means arranged to form an image of part of said measuring portion of the container; and data processing means for analyzing said image, said data processing means being programmed to identify in said image:
- (a) a first region having a first intensity that varies in accordance with the properties of the optically detectable feature; and
- (b) a second region having a second intensity that varies in accordance with the optical properties of the contents below the fill level, and to determine the distance between a point within the first region and the upper edge of the second region, thereby determining the height-of-fill of the container.

14. Apparatus according to claim 13 further comprising a radiation source arranged to pass radiation through said measuring portion of the container.

15. Apparatus according to claim 14 wherein the radiation source generates infra-red radiation.

16. Apparatus according to claim 13 for use with containers each having an opening at its upper end and a closure member substantially closing the opening, wherein the data processing means is programmed to detect as the first region at least part of the closure member and to determine the distance between the upper end of the closure member and the upper edge of the second region.

17. Apparatus according to claim 16 for use with containers in which the contents comprise a liquid having foam on the surface thereof, the data processing means being programmed to identify the first region of low radiation transmission associated with the closure member, the second region of high radiation transmission associated with the liquid, and a third region of low radiation transmission associated with the foam.

18. Apparatus according to claim 17 wherein the data processing means is programmed to determine the vertical height of the third region, to convert this vertical height to an equivalent vertical height of liquid, and to adjust the determined height-of-fill to allow for the amount of liquid which would be generated if the foam were converted to liquid.

19. Apparatus according to claim 13 wherein the image-forming means comprises a linear array of radiation detectors.

20. Apparatus according to claim 19 wherein the linear array of radiation detectors is spaced from the container and the image-forming means further comprises optical means for forming an image of the upper portion of the container on the linear array.

21. Apparatus according to claim 20 wherein the image formed on the linear array has a magnification less than one.

22. Apparatus according to claim 13 further comprising conveyor means for moving a plurality of the containers in single file past a station, and container detection means for detecting the presence of one of the containers at the station.

23. Apparatus according to claim 22 for use with containers each having an opening at its upper end and a closure member substantially closing the opening, wherein the container detection means comprises a radiation source arranged to project a first beam of radiation on to the closure member of a container at the station and a radiation detector arranged to detect a second beam produced by reflection of the first beam from the closure member.

24. A process for determining the height-of-fill of a container comprising a body, foamable liquid contents filling the body up to a fill level, and foam resting upon the liquid contents and extending from the fill level up to a foam level, at least an upper portion of the container extending from below the fill level to the foam level being capable of transmitting electromagnetic radiation, which process comprises:

illuminating at least the upper portion of the container with electro-magnetic radiation;

forming an image of part of said upper portion of the container; and analyzing the image by data processing means to identify:
- (a) a first region having a first intensity that varies in accordance with the optical properties of the foam; and
- (b) a second region having a second intensity that varies in accordance with the optical properties of the liquid contents, and determining the position of the boundary between the first and second regions, thereby determining the height-of-fill.

25. A process according to claim 24 further comprising determining the vertical height of the first region, converting this vertical height to an equivalent vertical height of liquid, and adjusting the determined height-of-fill for the amount of liquid which would be generated if the foam were converted to liquid.

26. A process according to claim 24 wherein the radiation is infra-red radiation, which is caused to pass through the upper portion of the container.

27. A process according to claim 24 wherein the image is formed by a linear array of radiation detectors.

28. A process according to claim 24 further comprising moving a plurality of the containers in single file past a station at which the containers are illuminated with the electromagnetic radiation and the images of the containers are formed, and detecting the presence of one of the containers at the station prior to forming the image thereof.

29. A process according to claim 28 wherein the presence of one of the containers at the station is effected by projected a first beam of radiation on to the container at the station and detecting the second beam produced by reflection of the first beam from the container.

30. Apparatus for determining the height-of-fill of a container comprising a body, foamable liquid contents filling the body up to a fill level, and foam resting upon the liquid contents and extending from the fill level up to a foam level, at least an upper portion of the container extending from below the fill level to the foam level being capable of transmitting electromagnetic radiation, the apparatus comprising:

image-forming means arranged to form an image of said upper portion of the container; and data processing means for analyzing said image, said data processing means being programmed to identify in said image:
- (a) a first region having a first intensity that varies in accordance with the optical properties of the foam; and
- (b) a second region having a second intensity that varies in accordance with the optical properties of the liquid contents, and to determine the position of the boundary between the first and second regions, thereby determining the height-of-fill.

31. Apparatus according to claim 30 wherein the data processing means is programmed to determine the vertical height of the second region, to convert this vertical height to an equivalent vertical height of liquid, and to adjust the determined height-of-fill for the amount of liquid which would be generated if the foam were converted to liquid.

32. Apparatus according to claim 30 further comprising a radiation source arranged to pass infra-red radiation through the upper portion of the container.

33. Apparatus according to claim 30 wherein the image-forming means comprises a linear array of radiation detectors.

34. Apparatus according to claim 30 further comprising conveyor means for moving a plurality of the containers in single file past a station, and container detection means for detecting the presence of one of the containers at the station.

35. Apparatus according to claim 34 wherein the container detection means comprises a radiation source arranged to project a first beam of radiation on to the container at the station and a radiation detector arranged to detect a second beam produced by reflection of the first beam from the container.

* * * * *